United States Patent
Ishizaki

(10) Patent No.: US 9,876,930 B2
(45) Date of Patent: Jan. 23, 2018

(54) IMAGE FORMATION METHOD, IMAGE FORMATION SYSTEM, AND MOBILE TERMINAL

(71) Applicant: Oki Data Corporation, Tokyo (JP)

(72) Inventor: Koji Ishizaki, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 15/257,983

(22) Filed: Sep. 7, 2016

(65) Prior Publication Data
US 2017/0078516 A1    Mar. 16, 2017

(30) Foreign Application Priority Data
Sep. 11, 2015  (JP) ................................. 2015-179709

(51) Int. Cl.
| | | |
|---|---|---|
| *H04N 1/32* | (2006.01) | |
| *H04N 1/00* | (2006.01) | |
| *H04N 1/34* | (2006.01) | |
| *H04W 76/02* | (2009.01) | |
| *G06Q 30/02* | (2012.01) | |
| *H04W 88/02* | (2009.01) | |

(52) U.S. Cl.
CPC ..... *H04N 1/32117* (2013.01); *G06Q 30/0283* (2013.01); *H04N 1/00307* (2013.01); *H04N 1/34* (2013.01); *H04W 76/02* (2013.01); *H04N 2201/0094* (2013.01); *H04W 88/02* (2013.01)

(58) Field of Classification Search
CPC .. H04N 1/32117; H04N 1/00307; H04N 1/34; H04N 2201/0094; H04W 76/02; H04W 88/02; G06Q 30/0283

USPC ....................................................... 358/1.15
See application file for complete search history.

(56) References Cited

U.S. PATENT DOCUMENTS

| | | | | |
|---|---|---|---|---|
| 7,184,976 | B1* | 2/2007 | Kumagai | G06Q 30/04 705/32 |
| 2002/0001099 | A1* | 1/2002 | Okuda | G06Q 30/04 358/1.15 |
| 2003/0025796 | A1* | 2/2003 | Yamagishi | H04N 1/00132 348/207.2 |
| 2008/0306845 | A1* | 12/2008 | Murayama | G06Q 20/102 705/34 |
| 2010/0067046 | A1* | 3/2010 | Tsukada | G06Q 20/145 358/1.15 |

FOREIGN PATENT DOCUMENTS

JP          2014-046594 A          3/2014

* cited by examiner

*Primary Examiner* — Allen H Nguyen
(74) *Attorney, Agent, or Firm* — Metrolexis Law Group, PLLC

(57) ABSTRACT

An image formation method using an image formation system, in which a mobile terminal is connected to a charge management device and an image formation device, includes: causing the mobile terminal to connect to the charge management device via a first communication path, and to update charge information; causing the mobile terminal to connect to the image formation device via a second communication path different from the first communication path; and causing the mobile terminal to transmit print data to the image formation device via the second communication path, and thereafter to update the charge information.

8 Claims, 10 Drawing Sheets

FIG. 3

| ITEM NAME | DETAIL OPTIONS |
|---|---|
| SSID | (USER'S CHOICE) |
| SECURITY | · NONE<br>· WEP<br>· WPA/WPA2 PSK |
| PASSWORD | (USER'S CHOICE) |
| IP ADDRESS | xxx. xxx. xxx. xxx |

STATE OF CONNECTION DESTINATION IDENTIFICATION INFORMATION FOR IDENTIFYING PRINTER AS CONNECTION DESTINATION BY MOBILE TERMINAL

FIG. 4

| PRODUCT ID (46A) | PRODUCT NAME (46B) | PRICE (46C) |
|---|---|---|
| 0001 | PRINT COUPON 1 | ¥10 |
| ⋮ | ⋮ | ⋮ |
| 0010 | PRINT COUPON 10 | ¥95 |
| ⋮ | ⋮ | ⋮ |
| 0019 | PRINT COUPON 100 | ¥900 |
| ⋮ | ⋮ | ⋮ |

STRUCTURE OF PRODUCT MANAGEMENT LIST 46

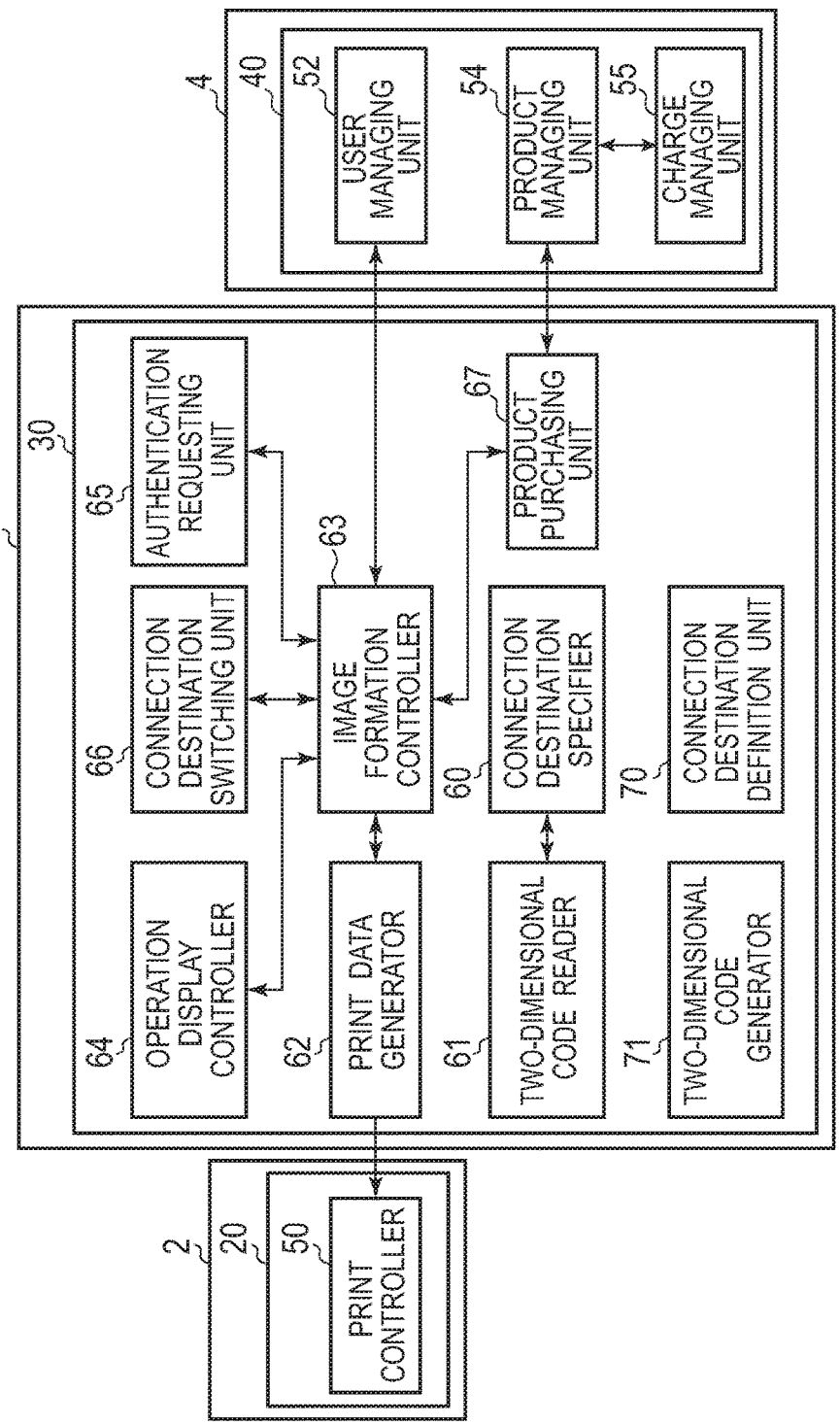

STRUCTURE OF USER INFORMATION LIST

FORMATION COMPLETION CHECK PROCESSING SUBROUTINE (1)

FORMATION COMPLETION CHECK PROCESSING SUBROUTINE (2)

IMAGE FORMATION METHOD, IMAGE FORMATION SYSTEM, AND MOBILE TERMINAL

CROSS REFERENCE TO RELATED APPLICATIONS

This application claims priority based on 35 USC 119 from prior Japanese Patent Application No. 2015-179709 filed on Sep. 11, 2015, entitled "IMAGE FORMATION METHOD, IMAGE FORMATION SYSTEM, AND MOBILE TERMINAL", the entire contents of which are incorporated herein by reference.

BACKGROUND OF THE INVENTION

1. Field of the Invention

The present disclosure relates to an image formation method, an image formation system, and a mobile terminal, and is preferably applied to, for instance, a service provider system that allows a user to use a printer installed in a corner of a public facility or a store at a charge, and provides the image formation service of forming a print image (in other words, printing).

2. Description of Related Art

In order to provide image formation service to users, a conventional print charge system includes an image formation device and a charge management device that are connected to each other via a communication network. In the print charge system, the image formation device, when used by a user to form a printed image, generates and transmits charge information to the charge management device, and the charge management device calculates a charge amount charged to the user based on the charge information (see, for instance, Japanese Patent Application Publication No. 2014-46594 (pp. 9 and 10, and FIG. 1)).

SUMMARY OF THE INVENTION

However, since the charge management device calculates the charge amount based on the charge information transmitted from the image formation device in the conventional print charge system, the image formation device to be used by users to provide image formation services is connected to the charge management device via a communication network. Thus, the print charge system has a problem of inconvenience because of an inability to allow users to use an image formation device to provide an image formation service if the image formation device is not connected to the charge management device via a communication network, such as an image formation device being installed in a location not provided with an access environment to a communication network or an image formation device installed without being connected to the communication network for security reasons even when an access environment is provided.

An object of an embodiment of the present invention is to propose an image formation method, an image formation system, and a mobile terminal that are capable of improving the convenience of the image formation system that provides image formation service.

An aspect of the invention is an image formation method using an image formation system in which a mobile terminal is connected to a charge management device and an image formation device. The image formation method includes: causing the mobile terminal to connect to the charge management device via a first communication path, and to update charge information; causing the mobile terminal to connect to the image formation device via a second communication path different from the first communication path; and causing the mobile terminal to transmit print data to the image formation device via the second communication path, and thereafter to update the charge information.

Thus, according to the above aspect of the invention, even when an image formation device is not connected to a charge management device, the image formation device may be used by a user of a mobile terminal to form a printed image at a charge to the user.

Thus, it is possible to implement an image formation method, an image formation system, and a mobile terminal that are capable of improving the convenience to the user of the image formation system that provides an image formation service.

BRIEF DESCRIPTION OF THE DRAWINGS

FIG. 3 is a schematic chart for explaining the connection destination identification information for the mobile terminal to identify the printer as a connection destination according to the first embodiment;

FIG. 4 is a schematic chart illustrating the structure of a product management list according to the first embodiment;

FIG. 5 is a block diagram illustrating the circuit configuration of functional circuit blocks of controllers of the printer, the mobile terminal, and the charge management server according to the first embodiment, for explaining various processing procedures performed by the controllers;

DETAILED DESCRIPTION OF EMBODIMENTS

Figure 1:
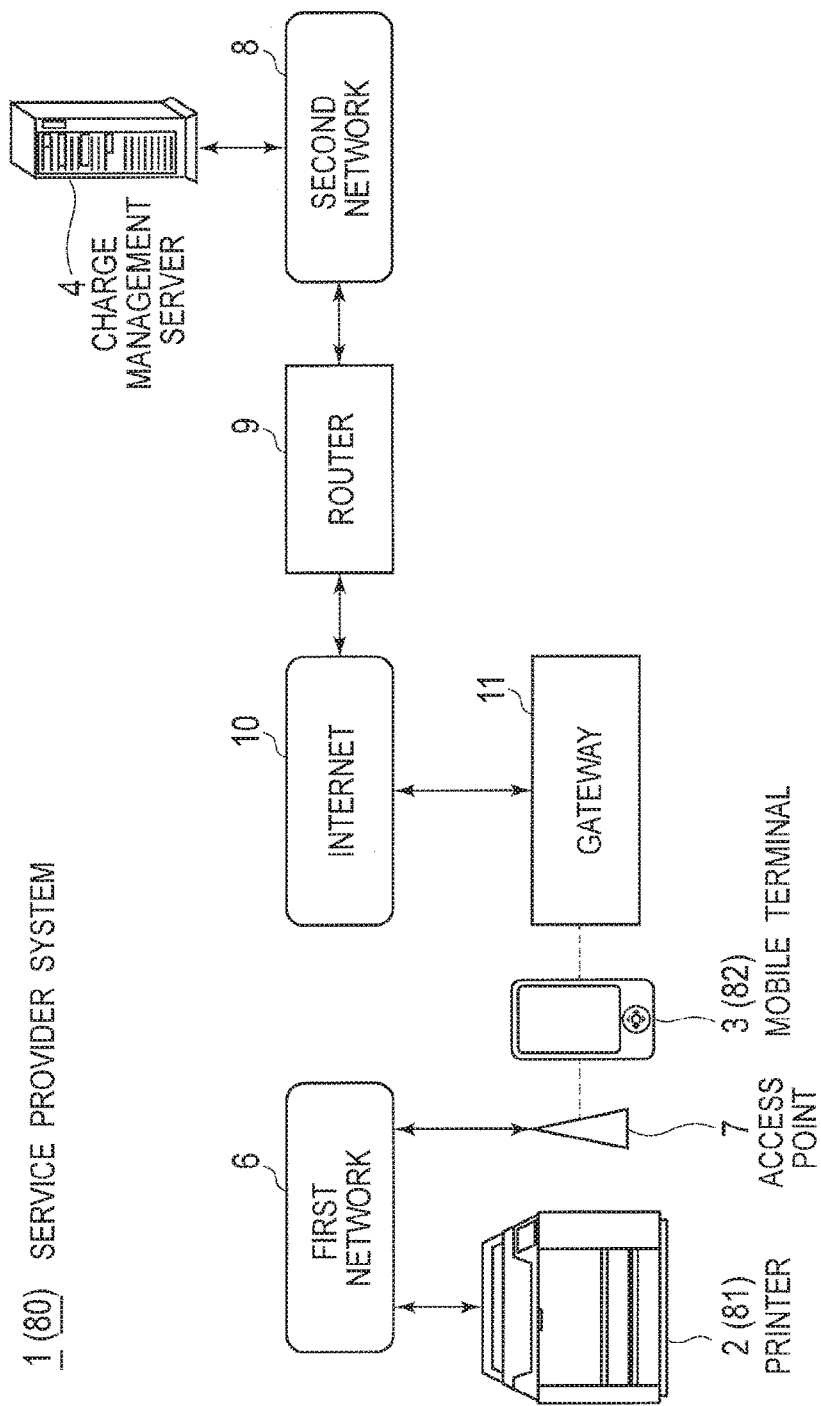
FIG. 1 is a block diagram illustrating the configuration of a service provider system according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

The description is given in the following order:
(1) First Embodiment,
(2) Second Embodiment, and
(3) Other Embodiments.

(1) First Embodiment (1-1) In configuration diagram 1 of the service provider system, as a whole, 1 indicates the service provider system according to first embodiment. Service provider system 1 provides an image formation service for users to form a printed image on the surface of a medium at a charge, and includes printer 2, mobile terminal 3 such as a smartphone or a tablet terminal, and charge management server 4 including computers. Printer 2 forms a printed image on the surface of a medium based on print data. As a reference, the print data is generated so to cause printer 2 to form a print image as an object to be formed (that is, an object to be printed) is formed in units of a page (that is, in units of a medium) for any number of pages (that is, one or more pages). Also, printer 2 is installed in a place where a user is allowed to enter freely, for instance, a public facility such as a city hall and a library, or a store such as a supermarket and a convenience store so that printer 2 is available to a user to form a print image via mobile terminal 3. Printer 2 is connected to access point 7 for wireless communication via first network 6 that is a local network such as a wireless local area network (LAN) and/or a wired LAN.

Charge management server 4 is managed and administered by a service providing company that provides an image formation service for users, and charges a user who uses printer 2 to form a print image for payment for the printed image formation. The charge management server 4 is connected to Internet 10, which is a wide area network, via second network 8 that is a local network such as a wireless LAN and/or a cable LAN, and via router 9 sequentially. Mobile terminal 3 is connected to a public network (not illustrated) by a first communication method in accordance with a mobile communication standard called 3G or a mobile communications standard such as a next-generation high-speed mobile communication standard called 4G Long Term Evolution (LTE), thereby making it possible to connect to and communicate with charge management server 4 via the public network which is a first communication path, gateway 11, Internet 10, router 9, and second network 8 sequentially. In addition, mobile terminal 3 may be connected to access point 7 by a second communication method in accordance with a communication standard for wireless LAN such as Wireless Fidelity (Wi-Fi), different from the first communication method, thereby making it possible to connect to and communicate with printer 2 via access point 7 which is on a second communication path different from the first communication path, and via first network 6 sequentially. In other words, mobile terminal 3 allows communication with printer 2 and charge management server 4 independently.

Thus, according to an operation of a user, mobile terminal 3 communicates with charge management server 4, and purchases from the charge management server 4, for instance, coupon data as gift certificate data to be used for payment for print image formation. Specifically, mobile terminal 3 obtains from charge management server 4, coupon data (that is, gift certificate data) which is charge information for charge management server 4 to charge a user for payment for the print image formation. Here, the coupon data indicates an amount of print images that can be formed depending on a sales price of the coupon data (hereinafter referred to as a formable image amount). Mobile terminal 3 then switches a connection destination from charge management server 4 to printer 2 to communicate with printer 2, and transmits to printer 2 print data corresponding to a formable image amount indicated by the coupon data. Thus, printer 2 forms a print image on the surface of one or more media based on the print data. In this manner, service provider system 1 provides the image formation service in such a manner that charge management server 4 charges a user for payment of the print image formation in the sales style of coupon data, and printer 2 is used for print image formation via mobile terminal 3.

Figure 2:
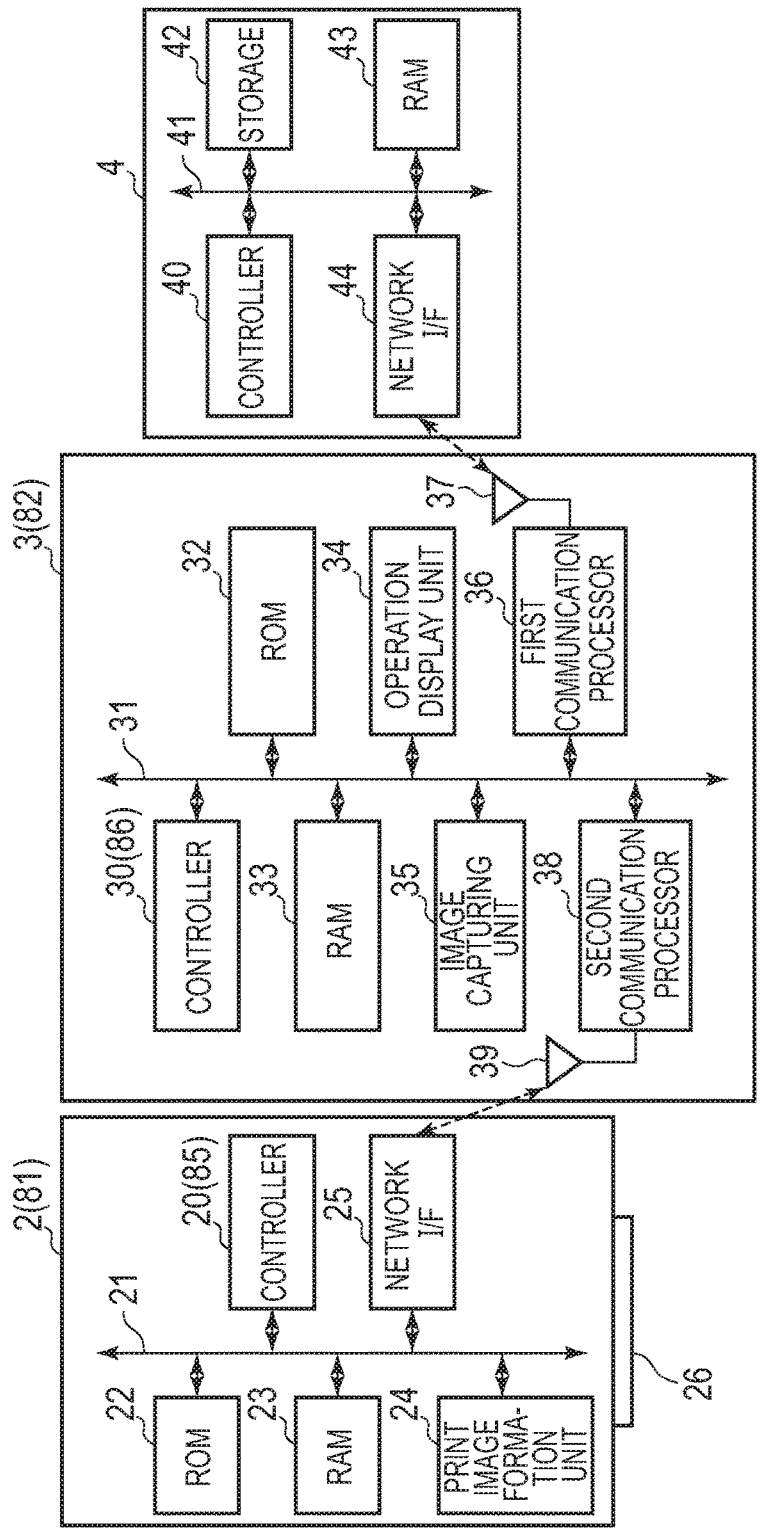
FIG. 2 is a block diagram illustrating the circuit configuration of hardware circuit blocks of a printer, a mobile terminal, and a charge management server according to the first embodiment.

(1-2) Circuit Configuration of Printer, Mobile Terminal and Charge Management Server Next, the circuit configuration formed of the hardware circuit block of each of printer 2, mobile terminal 3, and charge management server 4 is described with reference to FIG. 2. In order to simplify explanation, FIG. 2 illustrates the circuit configuration formed of the hardware circuit block of each of printer 2, mobile terminal 3, and charge management server 4 with the following excluded: the above-described first network 6 and access point 7 which are communication media between mobile terminal 3 and charge management server 4, and second network 8, router 9, Internet 10, gateway 11 and a public network between mobile terminal 3 and printer 2. Printer 2 has controller 20 which could be a central processor (CPU) or a microprocessor, for instance. Controller 20 is connected via bus 21 to read only memory (ROM) 22 and to random access memory (RAM) 23 which is a work area of controller 20. Controller 20 is also connected via bus 21 to print image formation unit 24 that forms a print image on the surface of a media, and to network interface 25 for communicating with mobile terminal 3 as described above. Based on this configuration, controller 20 reads various programs, such as a base program and an image formation processing program pre-stored in ROM 22, in RAM 23 as needed and loads the programs. Thus, controller 20 performs an overall control of the entire printer 2 in accordance with the various programs loaded in RAM 23, and performs various processing according to various commands and print data transmitted from mobile terminal 3.

When printer 2 is installed for the provision of an image formation service, the service providing company (that is, the service provider) encrypts or obfuscates connection destination identification information as illustrated in FIG. 3 for identifying printer 2 as a connection destination by mobile terminal 3, then codes the connection destination identification information, thereby generating a two-dimensional code in a predetermined format as an image in Portable Network Graphics (PNG) format, for instance. As a reference, the connection destination identification information includes information such as the IP (Internet Protocol) address of printer 2, the service set identifier (SSID) of access point 7 to which printer 2 is connected via first network 6, the type of security and a password. The two-dimensional code obtained by coding the connection destination identification information is, for instance, Quick Response (QR) code (registered trademark), DATA MATRIX (registered trademark), or Maxi Code (registered trademark). The service providing company affixes label 26 with the two-dimensional code printed to a predetermined visible position of the outer surface of printer 2. Thus, the service providing company allows mobile terminal 3 to specify printer 2, as the printer to be used by a user via mobile terminal 3 to form a print image, as a connection destination based on the two-dimensional code of label 26 affixed to printer 2. In other words, when printer 2 is used to form a print image by a user via mobile terminal 3, the service providing company allows mobile terminal 3 to communicate with printer 2 based on the two-dimensional code of label 26 affixed to printer 2.

Mobile terminal 3 has a controller 30 which could be a CPU or a microprocessor, for instance. Controller 30 is connected via bus 31 to ROM 32 and to RAM 33 which is a work area of controller 30. Controller 30 is also connected via bus 31 to image capturing unit 35, and to operation display unit 34 which is a touch screen that provides for the display of various images on a display screen and a touch operation. Furthermore, controller 30 is connected via bus 31 to first communication processor 36 and first antenna 37 for communicating with charge management server 4 sequentially as described above, and is connected to second communication processor 38 for communicating with printer 2 and second antenna 39 sequentially as described above. Based on this configuration, controller 30 reads various programs, such as a base program and a first image formation processing program pre-stored in ROM 32, in RAM 33 as needed and loads the programs. Thus, controller 30 performs an overall control of the entire mobile terminal 3 in accordance with the various programs loaded in RAM 33, and performs various processing according to communication with printer 2 and charge management server 4. Charge management server 4 has controller 40, which could be a CPU or a microprocessor, for instance. Controller 40 is connected via bus 41 to storage 42 such as a hard disk drive (HDD), to RAM 43 which is a work area of controller 40, and to network interface 44 for communicating with mobile terminal 3 as described above. Based on this configuration, controller 40 reads various programs such as a base program and a charge management processing program pre-stored in storage 42 in RAM 43 as needed, and loads the programs. Thus, controller 40 performs an overall control of the entire charge management server 4 in accordance with the various programs loaded in RAM 43, and performs various processing according to the communication with mobile terminal 3.

Controller 40 pre-stores multiple types of coupon data in storage 42. The multiple types of coupon data have different sales amounts according to the formable image amount, and coupon identification information, by which the multiple types of coupon data are individually identifiable and contain information indicating each formable image amount, are stored and generated. Here, in the first embodiment, for instance, a formable image amount is expressed in terms of points, and the number of points used for forming one page of a print image is defined to be one point. Thus, in the coupon data, as information indicating a formable image amount, data indicating the number of points corresponding to the formable image amount is stored. In storage 42, as coupon data, various types of data are stored including data indicating a formable image amount from one point to nine points in terms of 1 point as a unit, data indicating a formable image amount from 10 points to 90 points in terms 10 points as a unit, and data indicating a formable image amount from 100 points to 1000 points in terms 100 points as a unit. It is to be noted that each of the sales amounts of multiple types of coupon data is set to be lower as the formable image amount (that is, the number of points) increases.

Controller 40 also stores product management list 46, for instance, as illustrated in FIG. 4 for managing multiple types of coupon data as available for sale products. Product management list 46 includes product identification information column 46A for describing coupon identification information, product name column 46B for describing a product name attached to the coupon data, and price column 46C for describing a sales amount of the coupon data. Thus, in product management list 46, for each coupon data, coupon identification information, a product name, and a sales amount of the coupon data are described in association with each other. As a reference, in the product name of coupon data, a numeral indicating the number of points is included, for instance, like "print coupon 1" or "print coupon 10" to let a user easily recognize, when the coupon data is presented to the user, how much amount of print image is formable using the coupon data.

Here, various processing performed by respective controllers 20, 30, 40 of printer 2, mobile terminal 3, and charge management server 4 is specifically described with reference to FIG. 2 and FIG. 5. However, in FIG. 5, the hardware circuit blocks other than the above-described communication media and controllers 20, 30, 40 are excluded, and various functions implemented by controllers 20, 30, 40 in accordance with the various programs are each illustrated as a functional circuit block for convenience, and various processing performed by controllers 20, 30, 40 in accordance with the various programs is described as the processing executed by each functional circuit block. It is to be noted that printer 2, mobile terminal 3, and charge management server 4 may be provided with circuit blocks in a hardware configuration in which processing similar to that of the functional circuit blocks presented below is executable, and cause the circuit blocks in the hardware configuration to perform the various processing to be performed by controllers 20, 30, 40.

When printer 2 is used to form a print image by a user via mobile terminal 3, print controller 50 in printer 2 receives and takes in print data transmitted from mobile terminal 3 via network interface 25. Print controller 50 then drives and controls print image formation unit 24, thereby forming a print image in units of a page on the surface of one or more media based on the print data.

Figure 6:
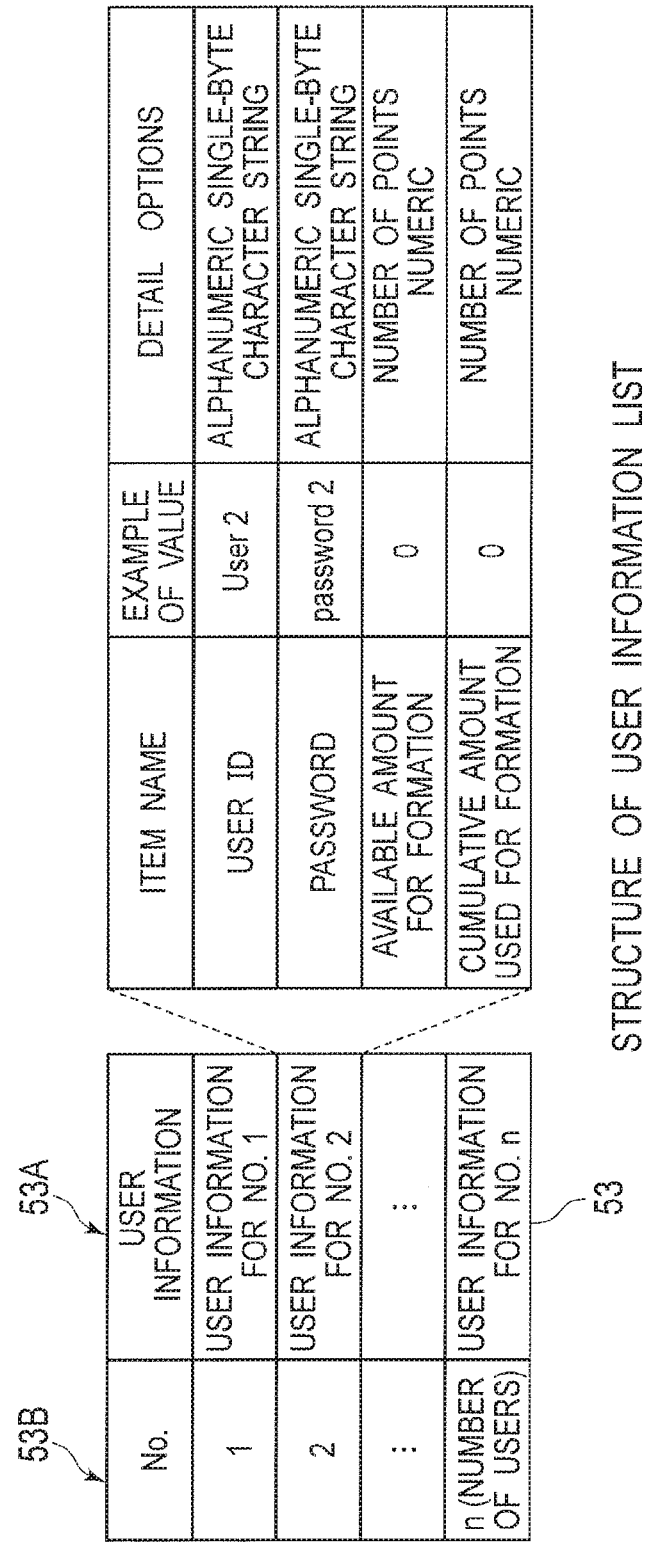
FIG. 6 is a schematic chart illustrating the structure of a user information list.

As illustrated in FIG. 6, user managing unit 52 in charge management server 4 stores in storage 42 user information 53A on multiple users who want to use the image formation service, as user information list 53, and registers and permits multiple users to use the image formation service. Here, in user information list 53, user information 53A of multiple users in storage 42 is arranged and generated in the order of the registration of the users, with registration number 53B assigned that indicates, for instance, the sequence number of the user registration and the number for a registered user. In user managing unit 52, user identification information and a password are registered in user information list 53 as user information 53A for each user. When printer 2 is used to form a print image, mobile terminal 3 allows a print image as an object to be formed along with the number of pages to be selected by a user in any manner. Thus, in mobile terminal 3, even when coupon data is purchased to use printer 2, a print image may be formed with the number of pages less than a formable image amount. In other words, in mobile terminal 3, at least part of the points indicating a formable image amount may remain in the purchased coupon data without being used to form a print image.

Thus, when at least part of the points indicating a formable image amount remains without being used to form a print image in mobile terminal 3 like this, user managing unit 52 manages the number of the remaining points such that the remaining points can be used to form a print image in the next or subsequent time. That is, user managing unit 52 also registers an available amount for formation indicating the number of points usable for print image formation in user information list 53 as user information 53A for each user. When the points purchased as coupon data via mobile terminal 3 are all used for print image formation, user managing unit 52 sets the number of points indicating an available amount for formation to 0, whereas when at least part of the points remains without being used for print image formation, user managing unit 52 sets the number of points indicating an available amount for formation to the number of remaining points. As a reference, user managing unit 52 also registers a cumulative amount used for the formation, indicating the cumulative amount of points used for print image formation via mobile terminal 3 in user information list 53 as user information 53A for each user.

When user registration request data, transmitted from mobile terminal 3 of a user who requests user registration, is actually received by network interface 44, in response to this, user managing unit 52 transmits user information request data requesting user identification information and a password as user information, to mobile terminal 3 from network interface 44. As a reference, in the following description, a user who requests user registration is also called a registration request user as needed. As a result, when user information notification data including user identification information and a password selected at will by a registration request user is transmitted from mobile terminal 3, user managing unit 52 receives and takes in the user information notification data via network interface 44. Thus, user managing unit 52 stores the user identification information and the password of the registration request user stored in the user information notification data in storage 42, and adds the user identification information and the password to user information list 53. In addition, user managing unit 52 also stores the formable image amount and cumulative amount used for formation of the registration request user in storage 42, and adds the formable image amount and cumulative amount used for formation to user information list 53. At this point, however, user managing unit 52 sets the number of points indicating each of the formable image amount and cumulative amount used for formation of the registration request user to an initial value of 0.

It is to be noted that user managing unit 52, when obtaining user identification information and a password of a registration request user, checks whether or not any of the user identification information and passwords of other registered users matches the user identification information and password of the registration request user before storing the user identification information and password in storage 42. When any of the user identification information and passwords of other registered users matches the user identification information and password of the registration request user, user managing unit 52 obtains user identification information and a password from the registration request user again. Thus, in storage 42, user managing unit 52 stores user identification information and a password unique to the registration request user. In this manner, user managing unit 52 registers the registration request user.

Once a user is registered, when user managing unit 52 subsequently communicates with mobile terminal 3 of the user, authentication request data including user identification information and a password is transmitted from mobile terminal 3 at the time of starting the communication, and user managing unit 52 receives and takes in the authentication request data via network interface 44. Thus, user managing unit 52 performs an authentication processing for a user of mobile terminal 3 based on the user identification information and password stored in the authentication request data, and the user identification information and passwords registered in user information list 53. As a result, when user managing unit 52 authenticates the user of mobile terminal 3 as an authorized user who is already registered (that is, is permitted to use the image formation service), user managing unit 52 notifies mobile terminal 3 of the successful authentication and continues to communicate with mobile terminal 3.

Thus, when an available amount of inquiry data inquiring about an available amount for formation is transmitted from mobile terminal 3 during communication before printer 2 is used to form a print image, user managing unit 52 receives and takes in the available amount inquiry data via network interface 44. At this point, user managing unit 52 reads the number of points indicating an available amount for formation of the user from storage 42, and generates the available amount notification data for notifying of an available amount for formation in terms of the number of points, then transmits the available amount notification data to mobile terminal 3 from network interface 44. Thus, when the number of points indicating an available amount for formation is one point or greater, user managing unit 52 allows mobile terminal 3 to use a desired number of points within the number of points indicating the available amount for formation, in order to form print images. When the available amount for formation is updated as described later due to the use of printer 2 for print image formation, and the updated available amount notification data indicating the updated available amount for formation in terms of the number of points is transmitted from mobile terminal 3 during communication, user managing unit 52 receives and takes in the updated available amount notification data via network interface 44. User managing unit 52 sends the number of points indicating the updated available amount for formation to storage 42, thereby overwriting the already-stored number of points indicating the available amount for formation. In other words, user managing unit 52 updates the available amount for formation of a user in user information list 53 according to the print image formation using printer 2. In this manner, user managing unit 52 manages the available amount for formation of each user such that the available amount for formation can be used to form a print image using printer 2. In other words, even if the points remain without being used up when printer 2 is used by a user and a print image is formed, user managing unit 52 manages the remaining points as the available amount for formation which may be used to form a print image in the next or subsequent time without being wasted.

As a reference, user managing unit 52, when taking in available amount inquiry data transmitted from mobile terminal 3 during communication, also reads the number of points indicating the cumulative amount used for formation of a user from storage 42, and also generates cumulative amount used for formation notification data notifying of a cumulative amount used for formation in terms of the number of points. In addition, user managing unit 52 also transmits cumulative amount used for formation notification data along with the available amount notification data to mobile terminal 3 from network interface 44. When printer 2 is used to form a print image, the cumulative amount used for formation is updated, and updated cumulative amount used for formation notification data, notifying of the updated cumulative amount used for formation in terms of the number of points, is transmitted along with the updated available amount notification data from mobile terminal 3. User managing unit 52 receives and takes in the cumulative amount used for formation notification data via network interface 44. Thus, user managing unit 52 sends the number of points indicating the updated cumulative amount used for formation to storage 42, overwrites the number of points indicating the pre-stored cumulative amount used for formation, and also updates the cumulative amount used for formation of the user in user information list 53.

When product presentation request data is transmitted from mobile terminal 3 (that is, of the user authenticated by user managing unit 52) during communication, product managing unit 54 receives and takes in the product presentation request data via network interface 44. At this point, product managing unit 54 generates sales product presentation image data for presenting all the coupon data by coupon identification information, product name, and sales amount based on the product management list 46 stored in storage 42, and transmits the sales product presentation image data to mobile terminal 3 from network interface 44. Thus, product managing unit 54 displays a sales product presentation image based on the sales product presentation image data in mobile terminal 3, and presents coupon data for sale to the user using the sales product presentation image. When coupon data desired to be purchased is selected as coupon identification information, and product purchase data including the selected coupon identification information is transmitted from mobile terminal 3, product managing unit 54 receives and takes in the product purchase data via network interface 44. Thus, product managing unit 54 reads coupon data identified by the coupon identification information from storage 42 based on the coupon identification information stored in the product purchase data, and transmits the coupon data to mobile terminal 3 from network interface 44.

At this point, product managing unit 54 sends coupon identification information stored in the product purchase data to payment managing unit 55. When coupon identification information is given from product managing unit 54, payment managing unit 55 reads from storage 42 the sales amount corresponding to the coupon identification information in product management list 46. Payment managing unit 55 lets the user pay the sales amount by an available payment method, such as an account withdrawal or a payment (specifically, lets the user pay the sales amount of coupon data received via mobile terminal 3). In this manner, product managing unit 54 along with payment managing unit 55 is able to sell to the user (in other words, let the user purchase) coupon data desired to be purchased, and is able to charge for the payment for print image formation in the sales style of coupon data.

Mobile terminal 3 is usually connected to a public network by the first communication method. In this state, when activation of an image capture function in a code reading mode is directed by the user via operation display unit 34 in the vicinity printer 2, connection destination specifier 60 activates the image capture function. Thus, connection destination specifier 60 guides the user via a display screen to capture the two-dimensional code of label 26 in a predetermined image capture range. Subsequently, when the surface of label 26 is captured by image capturing unit 35 according to an operation of the user to operation display unit 34, two-dimensional code reader 61 takes in captured image data from image capturing unit 35. Two dimensional code reader 61 identifies and cuts out the two-dimensional code from the captured image based on the captured image data, and sends the code data of the obtained two-dimensional code to connection destination specifier 60. Connection destination specifier 60 decodes and unscrambles the code data, and stores the obtained connection destination identification information in RAM 33. In addition, subsequent to capturing an image of the surface of label 26, when a desired image is selected for printing by a user from various images via operation display unit 34, print data generator 62 generates print data for forming the image as a print image for one or more pages based on the data of the selected image. Print data generator 62 then sends the print data to image formation controller 63. As a reference, mobile terminal 3 allows a user to select an image for printing from various images, such as a photograph image and a telephone book image stored in RAM 33 or a storage (not illustrated), an image on a web page on Internet 10, and an image of a document file provided by a file sharing service on the Cloud.

When the print data is given from print data generator 62, image formation controller 63 detects the number of pages of the print images to be formed based on the print data. Image formation controller 63 then determines the number of points expected to be used to form the print image as the expected amount of use, based on the detected number of pages of the print images. However, in the case of the first embodiment, for print image formation by printer 2, mobile terminal 3 uses one point per page from the points indicating each of the formable image amount and the available amount for formation. Thus, at this point, image formation controller 63 sets the expected amount of use to be the same number of points as the number of pages of the print images formed based on the print data. Subsequently, image formation controller 63 sends the print image to operation display unit 34 via operation display controller 64, thereby displaying the print image based on the print data as a preview on a display screen. In this state, when the execution of a printing is directed by a user, image formation controller 63 detects whether or not the user is currently logged in charge management server 4. As a result, when the user is not logged in charge management server 4, image formation controller 63 reads user information input image data from ROM 32, and sends the user information input image data to operation display unit 34 via operation display controller 64, thereby displaying the user information input image based on the user information input image data on the display screen. Here, the user information input image is generated to allow a user to input user identification information and a password as the user information on the display screen, and to prompt the user to request user registration in the case where the user has not registered with charge management server 4 yet.

Thus, at this point, when a user registration is requested by the user on the display screen, image formation controller 63 notifies authentication requesting unit 65 and connection destination switcher 66 that a user registration has been requested. At this point, authentication requesting unit 65 generates and sends the user registration request data to image formation controller 63. Also, connection destination switching unit 66 reads the pre-stored network address of charge management server 4 from RAM 33, and starts a communication with charge management server 4 via first communication processor 36 and the 1st antenna 37 sequentially using the network address. Thus, image formation controller 63 transmits the user registration request data to charge management server 4 via first communication processor 36 and first antenna 37 sequentially. As a result, image formation controller 63 receives the user information request data transmitted from charge management server 4 by first antenna 37 and takes in the user information request data via first communication processor 36, and accordingly, prompts the user to select and input user identification information and a password in any manner via the display screen. When user identification information and a password are inputted by the user on the display screen, image formation controller 63 generates user information notification data by authentication requesting unit 65, and transmits the user information notification data to charge management server 4 via first communication processor 36 and first antenna 37 sequentially.

On the other hand, at this point, since the user is already registered, when user identification information and a password are inputted by the user on the display screen, image formation controller 63 notifies connection destination switching unit 66 of the user registration, and sends the user identification information and the password to authentication requesting unit 65. Thus, authentication requesting unit 65 generates the authentication request data including the user identification information and the password, and sends the authentication request data to image formation controller 63. Also, connection destination switching unit 66 starts a communication with charge management server 4 in the same manner as described above. Thus, image formation controller 63 transmits the authentication request data to charge management server 4 via first communication processor 36 and first antenna 37 sequentially. In this manner, image formation controller 63, when being notified from charge management server 4 that user registration is completed, or that the user has been authenticated as an authorized user, subsequently transmits available amount inquiry data to charge management server 4 via first communication processor 36 and first antenna 37 sequentially. As a reference, in the case where the user is already logged in charge management server 4 when an execution of the printing is directed by the user, subsequent to the directions of execution of printing, image formation controller 63 transmits the available amount inquiry data to charge management server 4 via first communication processor 36 and first antenna 37 sequentially.

When available amount notification data is transmitted from charge management server 4, image formation controller 63 receives the available amount notification data by first antenna 37 and takes in the data via first communication processor 36. At this point, image formation controller 63 compares the expected amount of use indicating the number of points greater than or equal to one with the available amount for formation of the user notified as the number of points or greater by the available amount notification data. Image formation controller 63 then determines whether or not the expected amount of use exceeds the available amount for formation. As a result, when the expected amount of use exceeds the available amount for formation, image formation controller 63 reads coupon purchase inquiry image data from ROM 32 sends the coupon purchase inquiry image data to operation display unit 34 via operation display controller 64, thereby displaying a coupon purchase inquiry image on the display screen based on the coupon purchase inquiry image data. Thus, image formation controller 63 notifies a user via the coupon purchase inquiry image that available points are not sufficient to form, for instance, all pages of the print images, and makes an inquiry as to whether or not coupon data to be used to form the print image is to be purchased. When the purchase of coupon data is directed by the user on the display screen, image formation controller 63 notifies product purchasing unit 67 of the purchase of the coupon data.

At this point, product purchasing unit 67 generates product presentation request data, and transmits the product presentation request data to charge management server 4 via first communication processor 36 and first antenna 37 sequentially. Product purchasing unit 67 receives sales product presentation image data transmitted from charge management server 4 by first antenna 37 and takes in the data via first communication processor 36 and sends the data to image formation controller 63. Image formation controller 63 sends sales product presentation image data to operation display unit 34 via operation display controller 64 where the difference between the available amount for formation and the expected amount of use is indicated in terms of the number of points, for instance, thereby displaying the sales product presentation image based on the sales product presentation image data on the display screen. Thus, image formation controller 63 presents to the user coupon data for sale as the coupon identification information, product name, and sales amount via the sales product presentation image. Image formation controller 63 notifies a user via the sales product presentation image to what extent available points are not sufficient for formation of all pages of a print image specified in the directions for printing (in short, the number of points which are insufficient). In this state, when coupon data desired to be purchased is selected, for instance, as coupon identification information by a user on the display screen, image formation controller 63 sends the coupon identification information selected as the coupon data to product purchasing unit 67. Also, product purchasing unit 67 generates product purchase data including the coupon identification information, and transmits the product purchase data to charge management server 4 via first communication processor 36 and first antenna 37 sequentially. Thus, product purchasing unit 67 receives the coupon data transmitted from charge management server 4 by first antenna 37, takes in the coupon data via first communication processor 36, and sends the coupon data to image formation controller 63. In this manner, image formation controller 63 is able to purchase coupon data used to form a print image from charge management server 4. That is, image formation controller 63 is able to cause charge management server 4 to charge a user for payment for the print image formation.

At this point, image formation controller 63 retrieves the number of points indicating a formable image amount from the coupon data, and updates the available amount for formation by adding the number of points indicating the formable image amount, then notifies connection destination switching unit 66 of the updated available amount for formation. Upon receiving the notification from image formation controller 63, connection destination switching unit 66 terminates the communication with charge management server 4, and reads from RAM 33 connection destination identification information stored in connection destination specifier 60. Connection destination switching unit 66 starts a communication with printer 2 via second communication processor 38 and second antenna 39 sequentially in accordance with the connection destination identification information, thereby switching the connection destination from charge management server 4 to printer 2. Here, when the updated available amount for formation is greater than or equal to the expected amount of use, image formation controller 63 directs print data generator 62 to transmit print data to printer 2 as it is, without changing the expected amount of use at all. Thus, print data generator 62 transmits print data as it is to printer 2 via second communication processor 38 and second antenna 39 sequentially according to the directions of image formation controller 63. On the other hand, when even the updated available amount for formation is less than the expected amount of use, image formation controller 63 changes the number of points indicating the expected amount of use to the number of points indicating the available amount for formation. Based on the changed expected amount of use, image formation controller 63 determines the number of pages (hereinafter, also called the number of formable pages for convenience) of a formable print image by using the number of points indicating the changed expected amount of use.

Image formation controller 63 then directs print data generator 62 to transmit print data for forming a print image for the number of formable pages to printer 2. Thus, print data generator 62 sets new print data to a section, for instance, in the head of the print data for directing print image formation for the number of formable pages, according to the directions of image formation controller 63. Print data generator 62 then transmits the new print data to printer 2 via second communication processor 38 and second antenna 39 sequentially.

After image formation controller 63 makes an inquiry to a user as to whether or not coupon data is purchased, when a non-purchase of the coupon data is directed by the user on the display screen because the available amount for formation exceeds the expected amount of use, the coupon data is not purchased at this point. However, even when coupon data is not purchased like this, in the case where the number of points indicating the available amount for formation is greater than 0, image formation controller 63 notifies connection destination switching unit 66 of this situation. Thus, also in this case, connection destination switching unit 66 switches the connection destination from charge management server 4 to printer 2 in the same manner as described above. In the same manner as described above, image formation controller 63 changes the expected amount of use according to the available amount for formation to determine the number of formable pages, and directs print data generator 62 to transmit the print data to printer 2. Thus, print data generator 62 transmits part of the print data as new print data to printer 2 according to the directions of image formation controller 63 via second communication processor 38 and second antenna 39 sequentially in the same manner as described above.

In addition, when the expected amount of use is within the available amount for formation as a result of a comparison of the expected amount of use with the available amount for formation as described above, image formation controller 63 notifies connection destination switching unit 66 of this situation. Thus, connection destination switching unit 66 switches the connection destination from charge management server 4 to printer 2 in the same manner as described above. Image formation controller 63 then directs print data generator 62 to transmit the print data to printer 2 as it is, without changing the expected amount of use in the same manner as described above. Thus, print data generator 62 transmits the print data to printer 2 as it is according to the directions of image formation controller 63 via second communication processor 38 and second antenna 39 sequentially. As a reference, if the coupon data is not purchased according to the directions of a user in spite of the fact that the number of points indicating the available amount for formation is 0 (in other words, mobile terminal 3 has not obtained any points to be used to form a print image), image formation controller 63 does not allow printer 2 to be used to form the print image. Specifically, image formation controller 63 displays a predetermined message, for instance, on the display screen of operation display unit 34 and notifies the user that a print image is not allowed to be formed because points available for print image formation have not been obtained, then terminates the communication with charge management server 4 without transmitting the print data to printer 2. In this manner, when the number of points indicating the available amount for formation is greater than 0 regardless of any update of the available amount for formation, image formation controller 63 transmits the print data to printer 2 according to the available amount for formation and directs to form a print image. Thus it is possible to use printer 2 to form a print image for the number of formable pages within the available amount for formation (in short, corresponding to the expected amount of use).

When print data generator 62 transmits the print data to printer 2, image formation controller 63 sets an expected amount of use as an update to the expected amount of use which has been changed to be used as needed in order to direct print data generator 62 to transmit print data. The expected amount of use for update is used for an update of the available amount for formation. In other words, image formation controller 63 sets an expected amount of use as an update to the expected amount of use corresponding to the print data actually transmitted from print data generator 62 to printer 2 (that is, corresponding to the number of pages of a formable print image using the print data). Image formation controller 63 then updates the available amount for formation by subtracting the expected amount of use for update from the available amount for formation, and generates an updated available amount notification data indicating the updated available amount for formation in terms of the number of points. Subsequently, image formation controller 63 reads user information input image data from ROM 32, and displays the user information input image on the display screen of operation display unit 34 in the same manner as described above. Thus, when user identification information and a password are inputted by a user on the display screen, image formation controller 63 notifies connection destination switching unit 66 of the input, and generates authentication request data by authentication requesting unit 65 in the same manner as described above.

At this point, connection destination switching unit 66 terminates the communication with printer 2 and starts a communication with charge management server 4 in the same manner as described above. Thus, image formation controller 63 transmits the authentication request data again to charge management server 4 via first communication processor 36 and first antenna 37 sequentially. As a result, image formation controller 63, when being notified from charge management server 4 that the user has been authenticated as an authorized user, subsequently transmits the updated available amount notification data to charge management server 4 via first communication processor 36 and first antenna 37 sequentially. As a reference, at this point, image formation controller 63 updates the cumulative amount used for formation by adding the expected amount of use as an update to the cumulative amount used for formation. This thereby generates an updated cumulative amount used for formation notification data and the data is transmitted to charge management server 4. In this manner, image formation controller 63 causes charge management server 4 to update the available amount for formation and the cumulative amount used for formation of a user based on the updated available amount notification data and the updated cumulative amount used for formation notification data.

As a reference, connection destination definition unit 70 illustrated in FIG. 5 is for letting a user input and obtain connection destination identification information on printer 2, for instance, on the display screen of operation display unit 34. Two dimensional code generator 71 generates a two-dimensional code as an image in the same manner as described above based on the connection destination identification information obtained by connection destination definition unit 70. Connection destination definition unit 70 and two-dimensional code generator 71 are actually the function implemented by application software for a two-dimensional code generation, and it is not necessary to mount such a function particularly in mobile terminal 3 used by a user. However, if connection destination definition unit 70 and two-dimensional code generator 71 are mounted in a mobile terminal used by an administrator of the service provider system, when printer 2 is installed, the administrator may be allowed to use printer 2 at the installation location to print a two-dimensional code via the mobile terminal, and the two-dimensional code may be affixed to printer 2.

(1-3) First Image Formation Processing Procedure

Next, first image formation processing procedure RT1 performed by controller 30 of mobile terminal 3 is described with reference to the flow chart illustrated in FIG. 7. Controller 30 determines an expected amount of use of points used to form a print image based on print data, for instance, then displays the print image as a preview on the display screen of operation display unit 34 based on the print data. When execution of a printing is directed by a user on the display screen, on which the print image is displayed as a preview, of operation display unit 34, controller 30 starts first image formation processing procedure RT1 illustrated in FIG. 7 in accordance with a first image formation processing program pre-stored in ROM 32. Controller 30, when starting first image formation processing procedure RT1, obtains the available amount for formation of the user from charge management server 4 in step SP1, and the flow proceeds to next step SP2. In step SP2, controller 30 compares the available amount for formation and an expected amount of use, and determines whether or not the expected amount of use is greater than the available amount for formation. When an affirmative result is obtained in step SP2, the affirmative result indicates that it is not possible to form part or all of the pages of the print images for one of more pages of an object to be formed selected by a user because the expected amount of use is greater than the available amount for formation. When controller 30 obtains the affirmative result in step SP2, the flow proceeds to the next step SP3.

In step SP3, controller 30 displays a coupon purchase inquiry image on the display screen of operation display unit 34, and notifies a user that available points are not sufficient to form all pages of the print images, and determines whether or not coupon data used to form the print image is purchased. As a result, in step SP3, when controller 30 obtains an affirmative result because a purchase of coupon data is directed by the user on the display screen, the flow proceeds to the next step SP4. Thus, in step SP4, controller 30 obtains sales product presentation image data from charge management server 4, and displays a sales product presentation image on the display screen of operation display unit 34. When coupon data desired to be purchased is selected by a user on the display screen, accordingly the selected coupon data is purchased from charge management server 4, and controller 30 causes charge management server 4 to charge a user for the payment for the print image formation. Thus, controller 30 updates the available amount for formation by adding a formable image amount indicated by the coupon data, then the flow proceeds to the next step SP5.

On the other hand, in step SP3, when controller 30 obtains a negative result because a non-purchase of coupon data is directed by the user on the display screen, the flow proceeds to the next step SP5 without performing the processing in step SP4. Thus, in step SP5, controller 30 determines whether or not the number of points indicating the available amount for formation is 0 which is not usable for print image formation. When an affirmative result is obtained in step SP5, the affirmative result indicates that this time, printer 2 is used to form a print image for the first time or coupon data is to be purchased because the points were used without any remaining points when printer 2 was used last time for print image formation. When a negative result is obtained in step SP5, the negative result indicates that this time, only the remaining points are used to form a print image because some points were not used to form a print image and remained when printer 2 was used last time for the print image formation, or this time coupon data is additionally purchased although some points were not used and remained when printer 2 was used to form a print image. In step SP5, when controller 30 obtains the negative result, the flow proceeds to the next step SP6. When a negative result is obtained in step SP2, the negative result indicates that the expected amount of use is within the available amount for formation, and thus it is possible to form all pages of the print images for one of more pages of an object to be formed selected by a user without particularly purchasing coupon data by using some remaining points not used when printer 2 was used last time for print image formation. In step SP2, when controller 30 obtains a negative result, the flow proceeds to step SP6 without performing the processing in step SP3 to step SP5.

In step SP6, controller 30 switches the connection destination from charge management server 4 to printer 2, and the flow proceeds to the next step SP7. In step SP7, controller 30 transmits to printer 2 print data for forming a print image for the number of formable pages within the available amount for formation (in short, corresponding to the expected amount of use), and directs print image formation, then the flow proceeds to the next step SP8. In step SP8, controller 30 sets an expected amount of use as an update to the expected amount of use which has been changed to be used as needed in order to direct printer 2 to form a print image. In step SP8, controller 30 generates updated available amount notification data by updating the available amount for formation by subtracting the expected amount of use for update, and the flow proceeds to the next step SP9. In step SP9, controller 30 switches the connection destination from printer 2 to charge management server 4, and the flow proceeds to the next step SP10. In step SP10, controller 30 transmits the updated available amount notification data to charge management server 4. Thus, controller 30 updates the available amount for formation of the user according to the use of printer 2 this time based on the updated available amount notification data in charge management server 4, and the flow proceeds to the next step SP11 and completes first image formation processing procedure RT1.

As a reference, when an affirmative result is obtained in the above-described step SP5, the affirmative result indicates that this time, printer 2 is used to form a print image for the first time or the points were used without any remaining points when printer 2 was used the last time for the formation of a print but coupon data was not purchased, for instance, in order to stop the use of printer 2 although the user was prompted to purchase coupon data. In step SP5, when controller 30 obtains the affirmative result, the flow proceeds to step SP11 without performing the processing in step SP6 to step SP10, and completes first image formation processing procedure RT1.

(1-4) Operation and Effect of the First Embodiment

In the above configuration, when printer 2 is used to form a print image, mobile terminal 3 of service provider system 1 communicates with charge management server 4 and purchases coupon data used to form the print image, thereby causing charge management server 4 to charge a user for payment for print image formation. Subsequently, mobile terminal 3 switches the connection destination from charge management server 4 to printer 2, and transmits to printer 2 print data of the print image for one or more pages according to the coupon data which is charge information, thereby forming the print image in units of a page on the surface of one or more media by printer 2 based on the print data.

In the above configuration, even when printer 2 is installed without being connected to charge management server 4 in a communicable manner, service provider system 1 allows a user to use printer 2 for print image formation at a charge to the user for payment for print image formation. Thus, service provider system 1 allows printer 2 to be installed to construct the system irrespective of an installation location without the need of equipment or a device for connection to charge management server 4 and of maintenance management, and allows image formation service to be provided to users. Therefore, with service provider system 1, it is possible to improve the convenience dramatically compared with a conventional system.

In addition, in service provider system 1, in the case where, when mobile terminal 3 uses printer 2, at least part of the points obtained as coupon data remains without being used to form a print image, the connection destination is switched from printer 2 to charge management server 4, which is notified that the number of remaining points is the available amount for formation in the points available for print image formation in use of printer 2 in the next or subsequent time, and charge management server 4 manages the number of the remaining points. In service provider system 1, mobile terminal 3, when using printer 2 again, makes an inquiry to charge management server 4 about the available amount for formation, and the points corresponding to the available amount for formation (that is, the number of points) obtained in the inquiry may be used to form a print image. Specifically, mobile terminal 3 is to be carried by a user, and naturally may fail due to impact applied thereto such as by hitting against a wall or dropping by mistake, or may fail due to getting wet in the rain. For this reason, if information on the remaining points not used to form a print image is held by mobile terminal 3 itself, in case of failure, the information on the points may be lost or may not be readable. However, in service provider system 1, the remaining points not used to form a print image when mobile terminal 3 uses printer 2 is managed as the available amount for formation by charge management server 4 installed in, for instance, a service provision company. Therefore, in service provider system 1, it is possible to use coupon data purchased via mobile terminal 3 appropriately and economically for the print image formation.

In addition, in service provider system 1, when mobile terminal 3 uses printer 2, when the number of points indicating an available amount for formation is not sufficient for the points to be used to form a print image, a user is prompted to purchase coupon data. Thus, in service provider system 1, even with an insufficient number of points available for print image formation when mobile terminal 3 uses printer 2, coupon data may be purchased according to directions of a user, and points available for print image formation may be increased then used to form the print image. In addition, in service provider system 1, when mobile terminal 3 prompts a user to purchase coupon data, the user is also notified of the number of insufficient points for forming all pages of a print image specified by a user for printing. Thus, in service provider system 1, when mobile terminal 3 prompts a user to purchase coupon data, it is possible to make the user appropriately recognize the extent of the formable image amount included in the coupon data to be purchased to form all the pages of a print image, and thus an uneconomical purchase of coupon data with a formable image amount more than is needed may be avoided as much as possible.

Furthermore, in service provider system 1, in the case where only a part of a print image specified by a user for printing may be formed with the number of points indicated by the available amount for formation regardless of whether or not coupon data is purchased, print data of the print image is transmitted to printer 2 with the directions corrected so that some pages of a print image corresponding to the points of the available amount for formation (that is, the number of points) are formed. Thus, in service provider system 1, even with an insufficient number of points available for print image formation when mobile terminal 3 uses printer 2, it is possible to form some pages of a print image corresponding to the points, and thus an otherwise useless access of a user to the installation location of printer 2 may be avoided as much as possible.

(2) Second Embodiment

Next, a second embodiment is described with reference to FIGS. 8 to 11.

(2-1) Configuration of Service Provider System

First, the configuration of service provider system 80 (FIG. 1) according to the second embodiment is described. Service provider system 80 according to the second embodiment is configured in the same manner as in the above-described service provider system 1 (FIG. 1) according to the first embodiment except that the processing performed by printer (FIG. 1) and mobile terminal 82 (FIG. 1) is partially different. Thus, refer to the above description with reference to FIG. 1 for the configuration of service provider system 80 according to the second embodiment, and a description is omitted here.

(2-2) Circuit Configuration of Printer and Mobile Terminal

Next, the circuit configuration of printer 81 (FIG. 2) and mobile terminal 82 (FIG. 2) according to the second embodiment is described. However, printer 81 and mobile terminal 82 according to the second embodiment have the same circuit configuration formed of hardware circuit blocks as printer 2 and mobile terminal 3 according to the first embodiment described above, except that the processing performed by controller 85, 86 is partially different. Thus, refer to the above description with reference to FIG. 2 for the circuit configuration formed of hardware circuit blocks of printer 81 and mobile terminal 82 according to the second embodiment, and a description is omitted here. Thus, hereinafter the processing performed by respective controllers 85, 86 of printer 81 and mobile terminal 82 is described with reference to FIG. 8 in which each component and corresponding component in FIG. 5 are labeled with the same symbol. As a reference, hereinafter in FIG. 8, similarly to the case of FIG. 5, various functions implemented by controllers 85, 86 in accordance with the various programs are each illustrated as a functional circuit block for convenience, and various processing performed by controllers 85, 86 in accordance with the various programs is described as the processing executed by each functional circuit block. It is to be noted that in the following description, image formation processing performed for forming a print image on the surface of a media by print controller 50 of printer 81 driving and controlling print image formation unit 24 based on print data transmitted from mobile terminal 82 and other mobile terminals (not illustrated) is called a job as needed.

Whenever a job is executed by print controller 50, log generator 90 in printer 81 generates job execution result information indicating an execution result of the job, and the job execution result information for each job is stored in RAM 23 as log data of the history of use (hereinafter also referred to as a log) of printer 81 by mobile terminal 82 and other mobile terminals. Actually, at the time of completion of a job executed by print controller 50, log generator 90 generates job execution result information that indicates the execution results of the job, including the number of pages (hereinafter also referred to as a formation completed number of pages) of a print image actually formed by the job, the amount of use of the developing agent such as a toner, the size of the media on which the print image is formed, and whether or not an error has occurred during the execution of the job. In addition, as described later, data identification information by which print data is individually identifiable is added to the print data transmitted from mobile terminal 82. Log generator 90 adds the data identification information to corresponding job execution result information. Thus, when log data is provided to mobile terminal 82 in response to an acquisition request, log generator 90 lets job execution result information on a job executed according to directions of print image formation by mobile terminal 82 be identified from pieces of job execution result information included in the log data based on the data identification information.

Although image formation controller 92 in mobile terminal 82 performs the same processing as the processing performed by image formation controller 63 according to the first embodiment described above, image formation controller 92, when directing print data generator 93 to transmit print data in addition to this, generates and passes data identification information to print data generator 93. Here, image formation controller 92 generates the data identification information in which the time when directions of transmission of print data is given to print data generator 93 is linked to the media access control (MAC) address of mobile terminal 82 pre-stored, for instance, in ROM 32. Thus, although print data generator 93 performs the same processing as the processing performed by print data generator 62 according to the first embodiment described above, when data identification information along with the transmission directions of the print data is given from image formation controller 92, print data generator 93 adds the data identification information to the print data to be transmitted to printer 81. Print data generator 93 then transmits the print data to which the data identification information is added to printer 81 via second communication processor 38 and second antenna 39 sequentially. As a reference, image formation controller 92 may not generate data identification information, and print data generator 93 may generate data identification information in response to receiving transmission directions of print data from image formation controller 92.

After the print data is transmitted to printer 81 by print data generator 93, image formation controller 92 transmits the updated available amount notification data (and the updated cumulative amount used for the formation notification data) to charge management server 4, then further sets the formation completion check processing to be started by a timer operation, and directs timer operator 94 to start the timer operation. It is to be noted that the formation completion check processing is such that image formation controller 92 checks whether or not the print image formation as directed by the print data transmitted to printer 81 is completed, and corrects the already adjusted available amount for formation according to the formation completed number of pages. Timer operator 94 starts a timer operation according to the directions of image formation controller 92. When a suitably pre-selected predetermined processing start notification time is reached, timer operator 94 causes image formation controller 92 to start the formation completion check processing. Image formation controller 92, when starting the formation completion check processing, determines, for instance, whether or not communication is currently being made with printer 81, and when communication is being made, directs log acquiring unit 95 to acquire log data.

On the other hand, when communication is not currently being made, image formation controller 92 reads the connection destination switching inquiry image data from ROM 32, and sends the data to operation display unit 34 via operation display controller 64, thereby displaying a connection destination switching inquiry image on the display screen based on the connection destination switching inquiry image data. Thus, image formation controller 92 makes an inquiry to a user via the connection destination switching inquiry image as to whether the connection destination may be switched to printer 81 to check whether printing has been completed by printer 81, for instance. As a result, when the switching of the connection destination to printer 81 is directed by the user on the display screen, image formation controller 92 notifies connection destination switching unit 66 of the switching and directs log acquiring unit 95 to acquire log data. Thus, connection destination switching unit 66, for instance, terminates the communication with charge management server 4, and starts a communication with printer 81 in the same manner as described above. Thereby, according to the directions of image formation controller 92, log acquiring unit 95 transmits log acquisition request data to printer 81 via second communication processor 38 and second antenna 39 sequentially. When log data is transmitted from printer 81, log acquiring unit 95 receives the log data by second antenna and takes in the log data via second communication processor 38, and sends the log data to image formation controller 92.

Thus, image formation controller 92 searches the job execution result information to which the data identification information is added, as a check target for checking the formation completed number of pages in the log data, based on the data identification information of the print data transmitted to printer 81. When the job execution result information as the check target is included in the log data, image formation controller 92 obtains the formation completed number of pages from the job execution result information as the check target in the log data. Thus, image formation controller 92 calculates a differential number of pages by subtracting the formation completed number of pages from the number of pages (hereinafter also referred to as the formation direction number of pages) of a print image to be formed as directed to printer 81 by the print data transmitted to printer 81. In addition, image formation controller 92 calculates the number of points for correcting the available amount for formation properly as a correction amount (hereinafter also referred to as a correction amount for formation use), based on the differential number of pages. As a reference, in the case of the second embodiment, similarly to the case of the first embodiment described above, for print image formation by printer 81, mobile terminal 82 uses one point per page from the points indicating in each of the formable image amount or the available amount for formation. Thus, at this point, image formation controller 92 sets a correction amount for formation use to the same number of points as the differential number of pages. As a reference, when a formation completed number of pages is obtained from the job execution result information as the check target, image formation controller 92 calculates the number of points actually used to form a print image as the amount of use based on the formation completed number of pages. Subsequently, image formation controller 92 is able to calculate a correction amount for formation use by subtracting the amount of use from the above-described expected amount of use for the update corresponding to the formation direction number of pages.

Image formation controller 92 then generates correction direction data to notify of, for instance, the correction amount for formation use in terms of the number of points and to direct a correction of the available amount for formation (and the cumulative amount used for formation) by adding the correction amount for formation use thereto. Subsequently, image formation controller 92 reads the user information input image data from ROM 32, and displays the user information input image on the display screen of operation display unit 34 in the same manner as described above. Thus, when user identification information and a password are inputted by a user on the display screen, image formation controller 92 notifies connection destination switching unit 66 of the input, and generates authentication request data by authentication requesting unit 65 in the same manner as described above. At this point, connection destination switching unit 66 terminates the communication with printer 81 and starts a communication with charge management server 4 in the same manner as described above. Thus, image formation controller 92 transmits the authentication request data again to charge management server 4 via first communication processor 36 and first antenna 37 sequentially. As a result, image formation controller 92, when being notified from charge management server 4 that the user has been authenticated as an authorized user, subsequently transmits the correction direction data to charge management server 4 via first communication processor 36 and first antenna 37 sequentially. Thus, image formation controller 92 causes user managing unit 52 in charge management server 4 to correct the available amount for formation of the user by adding the correction amount for formation use based on the correction direction data.

As a reference, when non-switching of the connection destination to printer 81 is directed by the user on the display screen, image formation controller 92 for instance sets again the formation completion check processing to be started by a timer operation, and directs timer operator 94 to start the timer operation, then once terminates the formation completion check processing. Image formation controller 92 then starts the formation completion check processing again in response to the timer operation. In the case where, when log data is obtained from printer 81, a job based on print data transmitted by print data generator 93 has not been executed yet by printer 81, or job execution result information as the check target is not included in the log data because the job is in execution, also in this case, image formation controller 92 once terminates the formation completion check processing, then starts the formation completion check processing again. In this manner, image formation controller 92 calculates a correction amount for the formation use according to the formation completed number of pages when a job is executed by printer 81, and is able to correct the available amount for formation of a user managed by charge management server 4 properly based on the correction amount for formation use. Thus, even when a print image for a formation completed number of pages different from the formation direction number of pages is formed due to the occurrence of an error during the execution of a job by printer 81, image formation controller 92 is able to cause charge management server 4 to accurately manage the available amount for formation of a user and to charge the user an appropriate amount as payment for the print image formation.

(2-3) Second Image Formation Processing Procedure

Figure 7:
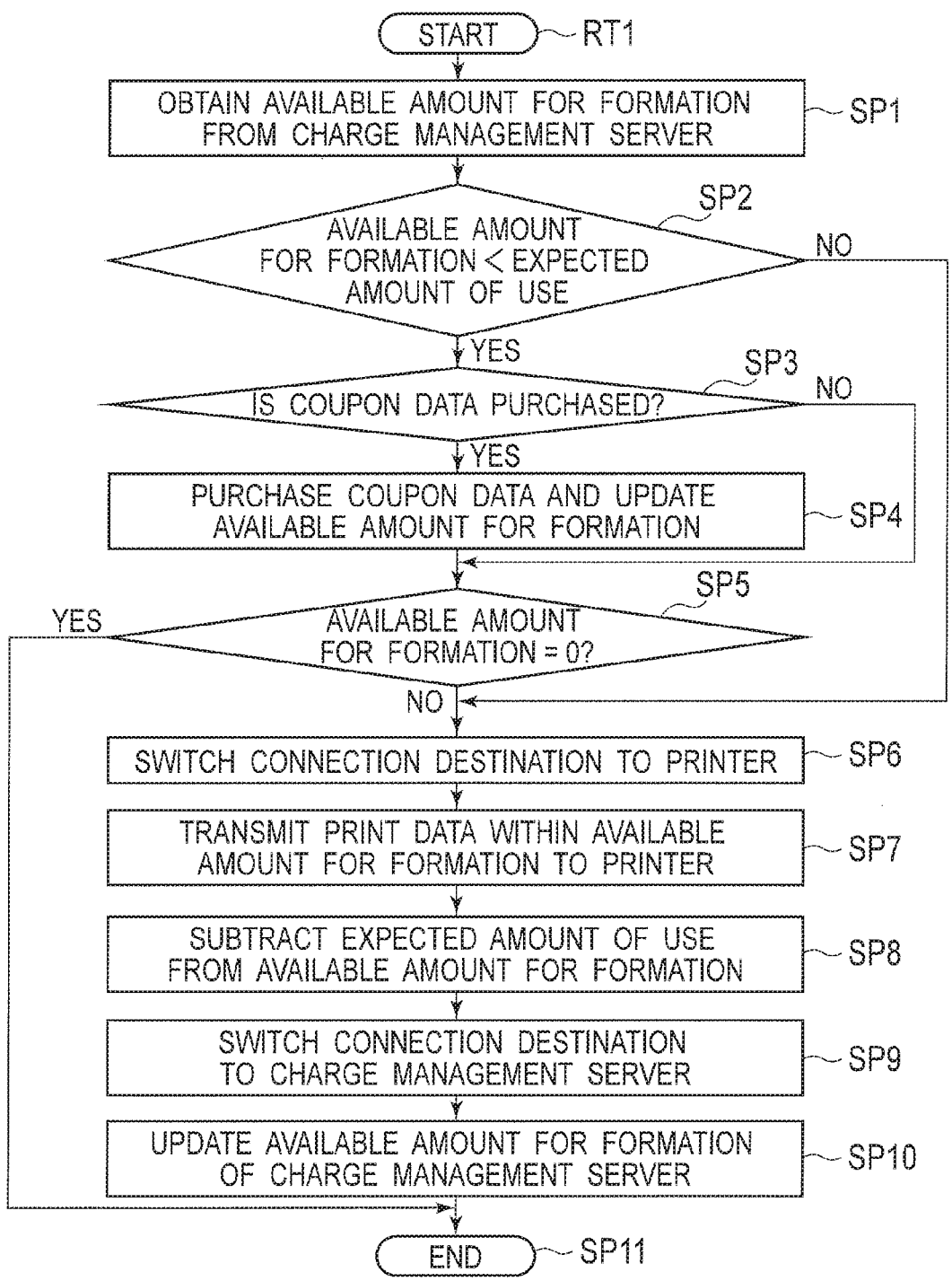
FIG. 7 is a flow chart illustrating a first image formation processing procedure (the first embodiment)
Figure 8:
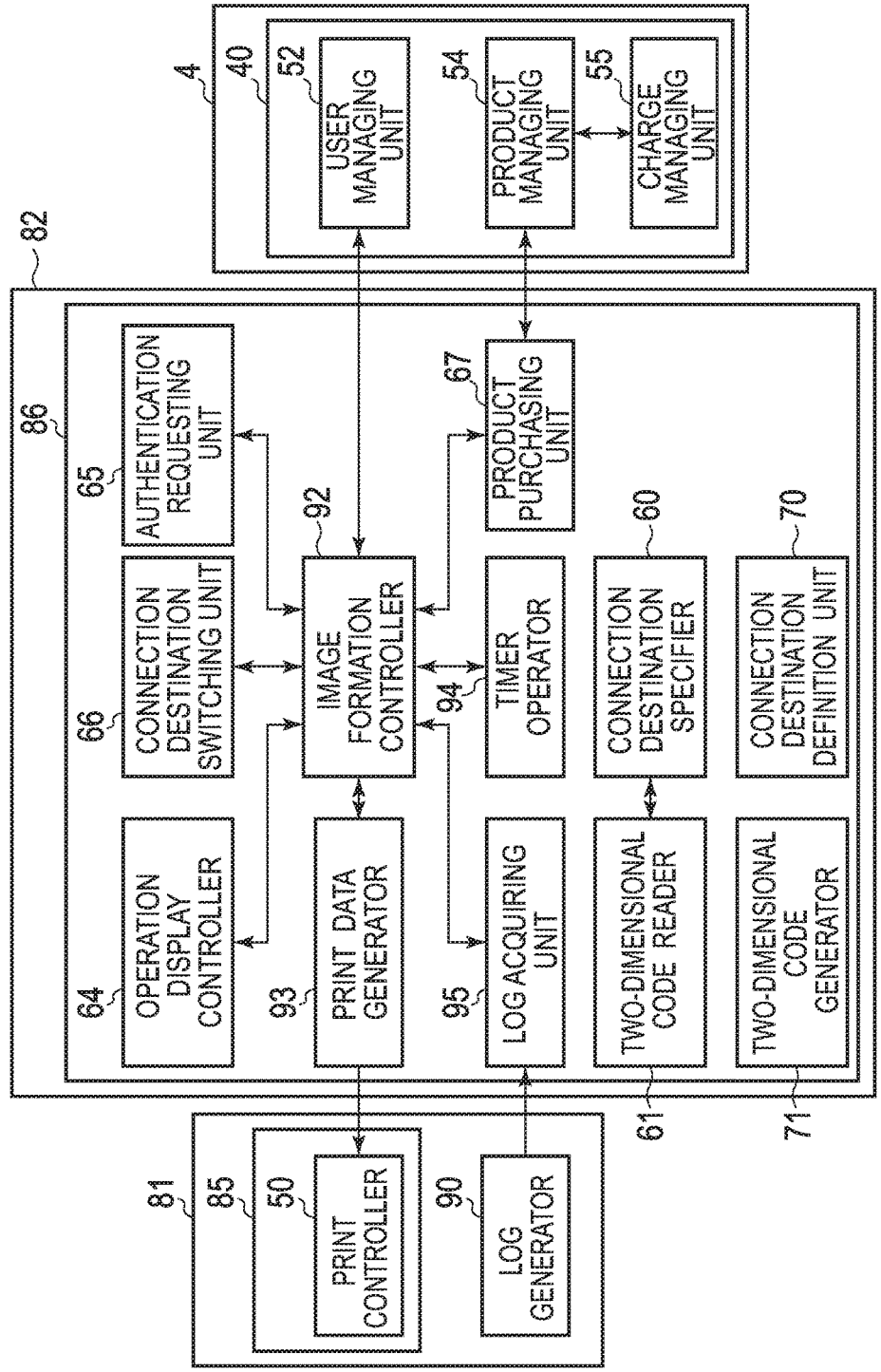
FIG. 8 is a block diagram illustrating the circuit configuration of functional circuit blocks of controllers of the printer, the mobile terminal, and the charge management server according to a second embodiment, for explaining various processing procedures performed by the controllers.
Figure 9:
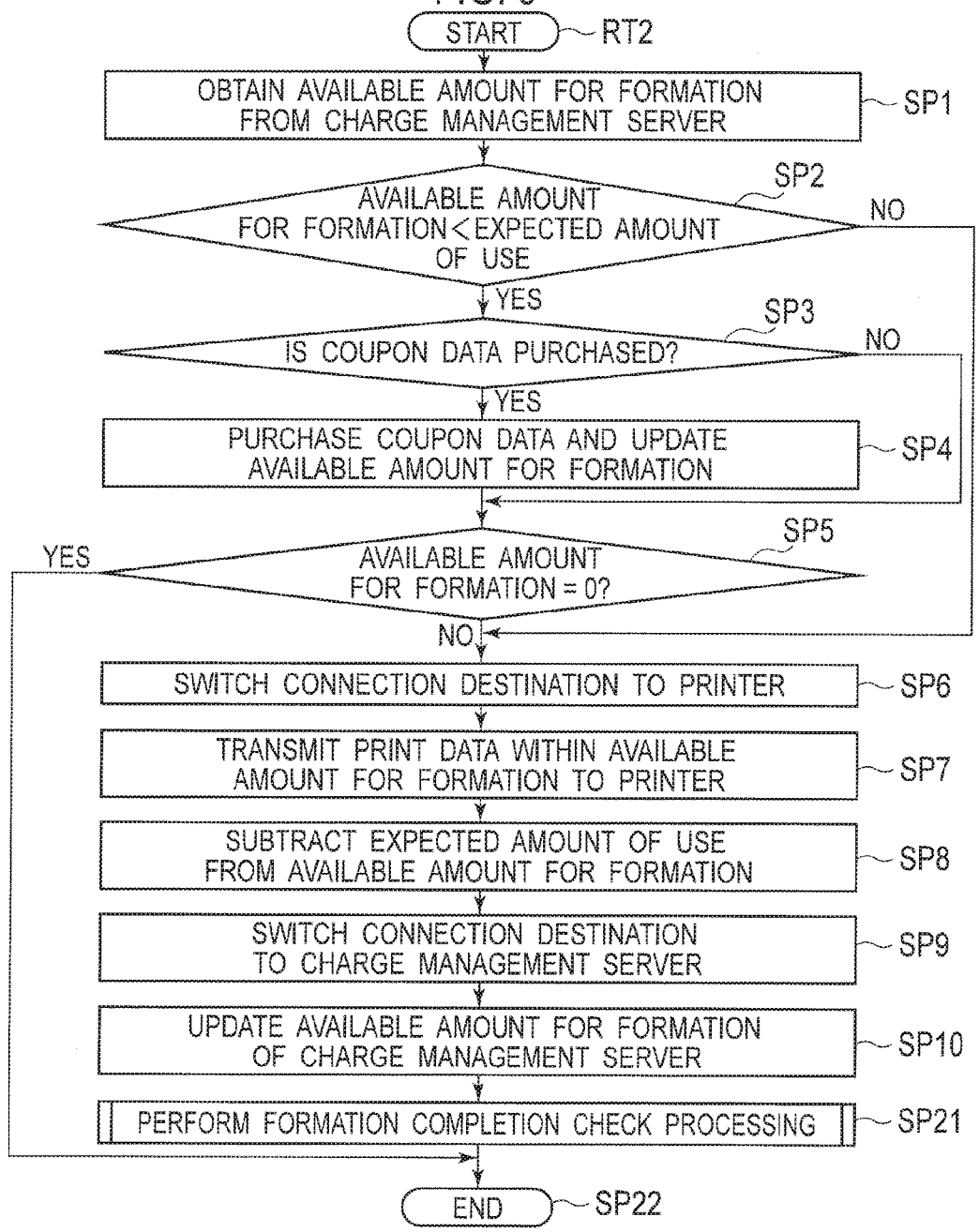
FIG. 9 is a flow chart illustrating a second image formation processing procedure (the second embodiment)
Figure 10:
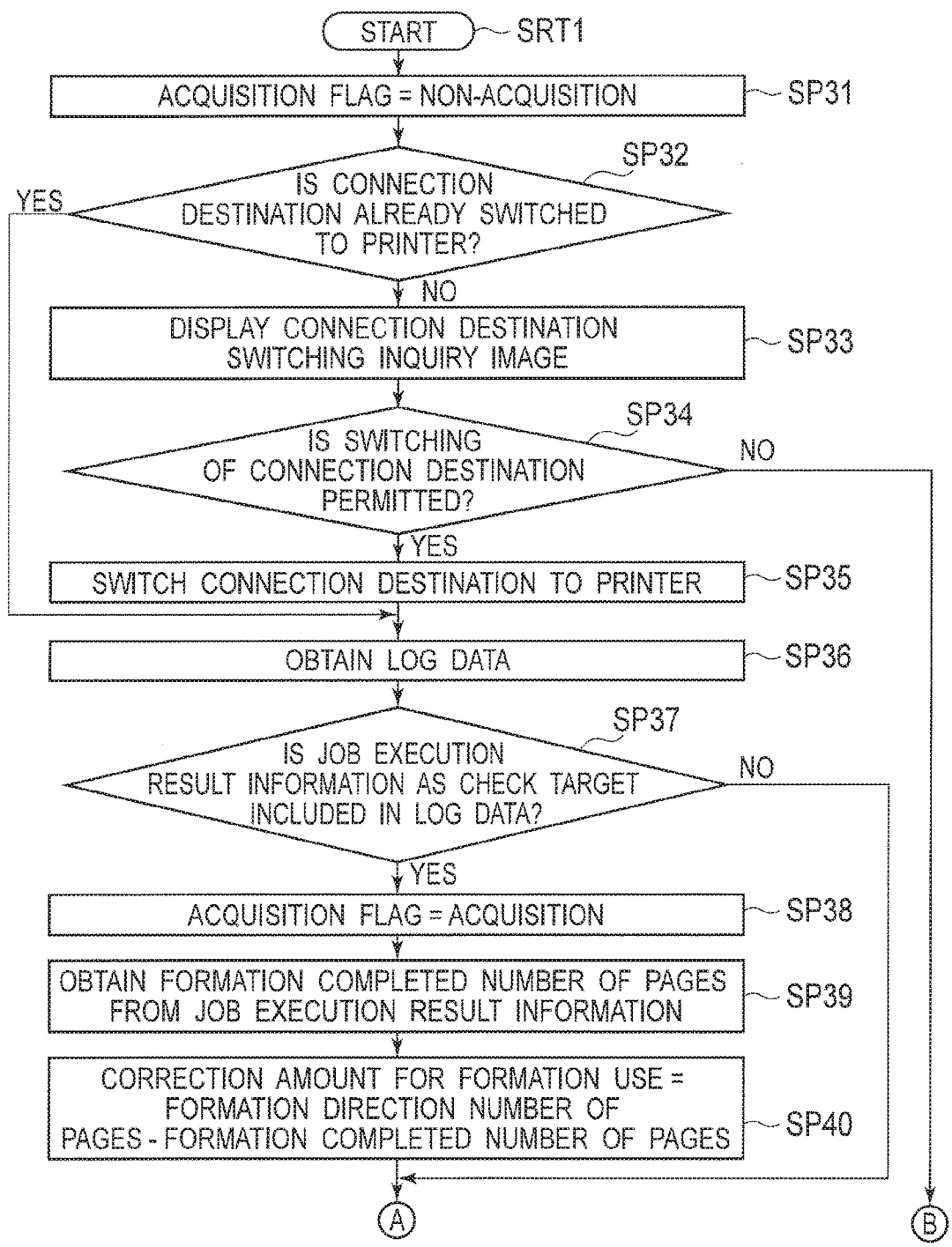
FIG. 10 is a flow chart illustrating the formation completion check processing subroutine (1) according to the second embodiment.
Figure 11:
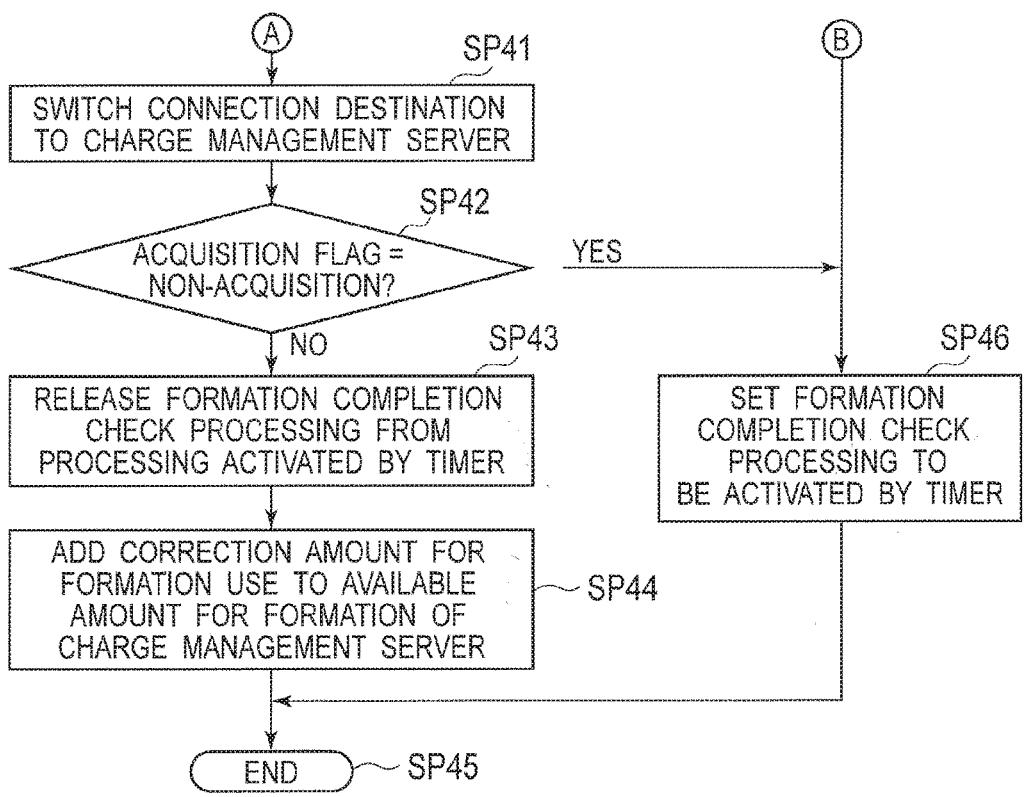
FIG. 11 is a flow chart illustrating the formation completion check processing subroutine (2) according to the second embodiment.

Next, second image formation processing procedure RT2 performed by controller 86 of mobile terminal 82 is described with reference to the flow charts illustrated in FIGS. 9 to 11 in which each component and corresponding component in FIG. 7 are labeled with the same symbol. When the execution of a printing is directed by a user, controller 86 starts second image formation processing procedure RT2 illustrated in FIG. 9 in accordance with a second image formation processing program pre-stored in ROM 32. Controller 86, when starting second image formation processing procedure RT2, performs the processing in step SP1 to step SP10 sequentially, then the flow proceeds to step SP21. In step SP21, controller 86 sets the formation completion check processing to be started by a timer operation, and performs the formation completion check processing in response to the timer operation.

Here, when the flow proceeds to step SP21, controller 86 starts formation completion check processing subroutine SRT1. Controller 86, when starting formation completion check processing subroutine SRT1, sets an acquisition flag to a predetermined value, for instance −1 indicating a non-acquisition in step SP31, and the flow proceeds to the next step SP32, the acquisition flag indicating whether or not the job execution result information as the check target has been obtained from printer 81. In step SP32, controller 86 determines whether or not the connection destination is already switched to printer 81. When a negative result is obtained because communication is not currently made with printer 81, the flow proceeds to the next step SP33. In step SP33, controller 86 displays a connection destination switching inquiry image on the display screen of operation display unit 34, and the flow proceeds to the next step SP34. In step SP34, controller 86 determines whether or not the connection destination is switched to printer 81. As a result, when controller 86 obtains an affirmative result in step SP34 because switching of the connection destination to printer 81 is directed by a user on the display screen, the flow proceeds to the next step SP35. Thus, in step SP35, controller 86 switches the connection destination from charge management server 4 to printer 81, and the flow proceeds to the next step SP36. As a reference, in step SP32, when controller 86 obtains an affirmative result because communication is currently being made with printer 81, the flow proceeds step SP36 without performing the processing in step SP33 to step SP35.

In step SP36, controller 86 obtains log data from printer 81, and the flow proceeds to the next step SP37. In step SP37, controller 86 determines whether or not the job execution result information as the check target is included in the log data. When controller 86 obtains an affirmative result because a job is already executed and completed based on the print data transmitted by mobile terminal 82, and the job execution result information as the check target is included in the log data, the flow proceeds to the next step SP38. In step SP38, controller 86 changes the acquisition flag to a predetermined value, for instance 0 indicating the acquisition of the job execution result information as the check target, and the flow proceeds to the next step SP39. In step SP39, controller 86 obtains the formation completed number of pages from the job execution result information as the check target, and the flow proceeds to the next step SP40. In step SP40, controller 86 subtracts the formation completed number of pages from the formation direction number of pages, and calculates a correction amount for formation use based on the obtained differential number of pages, and the flow proceeds to the next step SP41. As a reference, in step SP37, when controller 86 obtains a negative result because a job based on print data transmitted by mobile terminal 82 has not been executed yet or is being executed by printer 81, and the job execution result information as the check target is not included in the log data, the flow proceeds to step SP41 without performing the processing in step SP38 to step SP40. In step SP41, controller 86 switches the connection destination from printer 81 to charge management server 4, and the flow proceeds to the next step SP42.

In step SP42, controller 86 determines whether or not the acquisition flag indicates a value of a non-acquisition. When controller 86 obtains a negative result because the job execution result information as the check target is obtained, the flow proceeds to the next step SP43. In step SP43, controller 86 releases the formation completion check processing from being started by a timer operation, and the flow proceeds to the next step SP44. In step SP44, controller 86 generates correction direction data based on the correction amount for formation use, and transmits the correction direction data to charge management server 4. Thus, controller 86 causes charge management server 4 to correct the available amount for formation of the user by adding the correction amount for formation use based on the correction direction data, and the flow proceeds to the next step SP45. Thus, in step SP45, controller 86 exits formation completion check processing subroutine SRT1, and returns to step SP22 of second image formation processing procedure RT2 and exits second image formation processing procedure RT2.

In step SP34 described above, when controller 86 obtains a negative result because a non-switching of the connection destination to printer 81 is directed by the user on the display screen, the flow proceeds to step SP46. Also, in step SP42 described above, when controller 86 obtains an affirmative result because the job execution result information as the check target has not been obtained yet, the flow also proceeds to step SP46. In step SP46, controller 86 sets the formation completion check processing to be started by a timer operation again, and the flow proceeds to step SP45. However, when the flow proceeds to step SP45 after processing in step SP46 is performed, at this point, controller 86 once exits formation completion check processing subroutine SRT1 in step SP45, however, the flow does not return to step SP22 of second image formation processing procedure RT2 and controller 86 performs the processing (that is, formation completion check processing subroutine SRT1 is started by a timer operation) in step SP21 again.

(2-4) Operation and Effect of Second Embodiment

In the above configuration, mobile terminal 82 of service provider system 80, when using printer 81 for print image formation, switches the connection destination from charge management server 4 to printer 81, obtains log data from printer 81, and calculates a correction amount for formation use for correcting the available amount for formation properly, according to the formation completed number of pages of the print image obtained based on the log data. Mobile terminal 82 then switches the connection destination from printer 81 to charge management server 4, and transmits to charge management server 4 the correction direction data for correcting the available amount for formation based on the correction amount for formation use, thereby causing charge management server 4 to correct the available amount for formation of a user properly based on the correction direction data.

In the above configuration, with service provider system 80, it is possible to obtain the same effect as the effect obtained by the first embodiment described above. In addition to this, while printer 81 is used by mobile terminal 82, even when a print image for a formation completed number of pages different from the formation direction number of pages is formed due to the occurrence of an error during the execution of a job by printer 81, image formation controller 92 is able to cause charge management server 4 to manage the accurate available amount for formation of a user and to charge the user for payment for print image formation appropriately without causing the user to pay extra. Thus, service provider system 80 enables the convenience to be further improved.

(3) Other Embodiments (3-1) First Other Embodiment

In the first and second embodiments described above, the case has been described in which the formable image amount is expressed in terms of points, and the number of points used for forming one page of a print image is defined to be one point. However, the invention is not limited to this. Although the formable image amount is expressed in terms of points, for instance, the number of points used for forming one page of a print image may be a different number of points depending on the type and formation conditions of the print image, such as whether the print image is color or monochrome, the size of the media of which the print image is composed, and the amount of developing agent consumed to form one page of the print image. With this configuration of the invention, in contrast to the first and second embodiments described above, it is possible to charge a user for payment for print image formation more appropriately.

When this configuration is applied to the second embodiment described above, mobile terminal 82 obtains from printer 81 also the type and formation conditions of a print image along with the formation completed number of pages based on the job execution result information. A correction amount for formation use may be determined based on at least one of these factors. With this configuration of the invention, even when the formation completed number of pages is less than or equal to the formation direction number of pages, the points actually used for the print image formation is not only possible to be less than the number of points indicating the expected amount of use for update, but is also possible to be greater than the number of points indicating an expected amount of use for update because, for instance, the amount of the consumption of the developing agent is greater than a predicted amount. However, in the invention, when the second image formation processing procedure RT2 described above (that is, the formation completion check processing subroutine SRT1) with reference to FIGS. 9 to 11 is executed, the number of points indicating the correction amount for formation use may be labeled with a positive or negative sign, thereby making it possible to appropriately correct the available amount for formation. In other words, in the invention, even when the number of points to be used to form one page of print image is changed to a different number of points depending on the type and formation conditions of the print image, it is possible to appropriately correct the available amount for formation. With this configuration of the invention, for instance, as a result of a correction of the available amount for formation by charge management server 4, even when the available amount for formation is a negative number of points (in other words, even when points greater the amount charged as the sales price of coupon data are used for the print image formation by a user), the payment is made with additional charges at the correction of the available amount for formation, and thus it is possible to appropriately charge a user for payment for print image formation.

(3-2) Second Other Embodiment

In the first and second embodiments described above, the case has been described in which mobile terminals 3, 82 communicate with charge management server 4 via the public network as the first communication path and Internet 10 sequentially. However, the invention is not limited to this, and in the case where access point 7 for the installation location of printers 2, 81 is connected to Internet 10, mobile terminals 3, 82 may communicate with charge management server 4 via access point 7 as the first communication path and Internet 10 sequentially. As a reference, in the invention, for instance, printers 2, 81 may not be connected to access point 7 via first network 6, but may be directly connected to the access point or may include the access point. However, in the case of this configuration of the invention, two access points are present at the installation location of printers 2, 81 for communication with printers 2, 81 and for communication with charge management server 4 by mobile terminals 3, 82. In the case where mobile terminal 3 holds the SSID of an access point connected for communication, and a user comes to the installation location of printers 2 and 81 again, it may be difficult for mobile terminals 3, 82 to selectively use the held SSID for communication with printers 2, 81 and for communication with charge management server 4. Thus, in the case of this configuration of the invention, when the use of printers 2, 81 is completed, let mobile terminals 3, 82 delete the SSID for communication with printers 2, 81, and each time a user comes to the installation location of printers 2, 81, let the user obtain connection destination identification information including the SSID for communication with printers 2, 81 based on the two-dimensional code of label 26, then it is possible to communicate with printers 2, 81 and charge management server 4 reliably. As a reference, in the invention, for instance, in the case of the first embodiment mobile terminal 3 performs the processing in step SP6 in first image formation processing procedure RT1, or in the case of the second embodiment mobile terminal 82 performs the processing in step SP41 in second image formation processing procedure RT2, deleting the SSID for communication with printers 2, 81 allows printers 2, 81 to be used for print image formation without any problem. Note that, in the invention, let mobile terminals 3, 82 communicate with printers 2, 81 by the second communication method in accordance with a short range wireless communication standard such as Bluetooth (registered trademark) rather than the second communication method in accordance with a communication standard for wireless LAN such as Wi-Fi, or mobile terminals 3, 82 may be connected to printers 2, 81 via a communication cable in accordance with a serial bus standard such as Universal Serial Bus (USB), and may communicate with printers 2, 81 by the second communication method in accordance with the serial bus standard.

(3-3) Third Other Embodiment

Furthermore, in the first and second embodiments described above, the case has been described in which when mobile terminals 3, 82 obtain coupon data from charge management server 4, charge management server 4 prompts a user to make payment of the sales amount of the coupon data received via mobile terminal 3. However, the invention is not limited to this. For instance, when coupon data is obtained by mobile terminals 3, 82, charge management server 4 may not prompt a user to make payment of the sales amount of the coupon data, but receives notification of an expected amount of formation use instead of notification of updated available amount for formation from mobile terminals 3, 82, and may prompt the user to make a payment of the sales amount of the points actually used for print image formation based on the notified expected amount of formation use. With this configuration of the invention, although coupon data is obtained, each time a user uses printers 2, 81 via mobile terminals 3, 82, it is possible to purchase only the points actually used for print image formation. As a result, it is unnecessary to manage the available amount for formation of a user by charge management server 4, and user information managed by charge management server 4 may be reduced.

(3-4) Fourth Other Embodiment

Furthermore, in the first and second embodiments described above, the case has been described in which mobile terminals 3, 82 transmit print data to printers 2, 81, then the available amount for formation is updated by subtracting the expected amount of use for update from the available amount for formation. However, the invention is not limited to this. After mobile terminals 3, 82 transmit print data to printers 2, 81, the expected amount of use for update data indicating the expected amount of use for update may be transmitted to charge management server 4, and the available amount for formation may be updated by subtracting the expected amount of use for update (indicated by the expected amount of use for update data) from the available amount for formation by charge management server 4. With this configuration of the invention, it is unnecessary to update the available amount for formation in mobile terminals 3, 82, and it is possible to reduce the processing load.

(3-5) Fifth Other Embodiment

Furthermore, in the first and second embodiments described above, the case has been described in which after mobile terminal 82 notifies charge management server 4 of the updated available amount for formation, a correction amount for formation use is calculated based on the job execution result information obtained by communicating with printer 81, and charge management server 4 is notified of the correction amount for formation use, then the available amount for formation is corrected by charge management server 4 based on the correction amount for formation use. However, the invention is not limited to this, and for instance, after mobile terminal 82 transmits print data to printer 81, subsequently, the formation completion check processing is performed and a correction amount for formation use is calculated. In the invention, based on the correction amount for formation use and the expected amount of use, mobile terminal 82 may update the available amount for formation by subtracting the expected amount of use which is properly corrected using a correction amount for formation use, and may notify charge management server 4 of the updated available amount for formation to be managed by charge management server 4. In the invention, for instance, after mobile terminal 82 notifies charge management server 4 of the updated available amount for formation, a correction amount for formation use is calculated based on job execution result information obtained by communicating with printer 81. However, the updated available amount for formation may be properly corrected based on the correction amount for formation use, and charge management server 4 may be notified of the corrected available amount for the formation. According to these configurations in the invention, it is unnecessary to correct the available amount for formation in charge management server 4, and it is possible to reduce the processing load.

(3-6) Sixth Other Embodiment

Furthermore, in the first and second embodiments described above, the case has been described in which when mobile terminals 3, 82 use printers 2, 81, the connection destination is automatically switched. However, the invention is not limited to this, and for instance, in the case where a base program, which makes it difficult to implement automatic switching of the connection destination for the sake of security, is installed in mobile terminals 3, 82, each time the connection destination is switched, an inquiry may be made to a user and the connection destination may be switched by the directions of the user.

(3-7) Seventh Other Embodiment

Furthermore, in the first and second embodiments described above, the case has been described in which mobile terminals 3, 82 capture the two-dimensional code of label 26 affixed to the outer surface of printers 2, 81, and connection destination identification information is obtained based on the captured two-dimensional code. However, the invention is not limited to this, and for instance printers 2, 81 may be provided with an IC chip which allows information to be read by non-contact communication, such as an integrated circuit (IC) tag that stores connection destination identification information, and the connection destination identification information may be obtained from the IC chip by non-contact communication by holding mobile terminals 3, 82 over an installation position of the chip of printers 2, 81. In the invention, connection destination identification information may be stored in ROM 22 of printers 2, 81, and mobile terminals 3, 82 may be connected to and communicate with printers 2, 81 via a communication cable, then the connection destination identification information may be obtained from printers 2, 81. In the invention, instead of obtaining the connection destination identification information of printers 2, 81 by mobile terminals 3, 82 before the execution of printing is directed by a user (that is, before mobile terminals 3, 82 are connected to charge management server 4), after mobile terminals 3, 82 communicate with charge management server 4 according to the directions of execution of printing by the user, when the connection destination is switched from charge management server 4 to printers 2, 81, the connection destination identification information may be obtained.

(3-8) Eighth Other Embodiment

Furthermore, in the first and second embodiments described above, the case has been described in which controllers 30, 86 of mobile terminals 3, 82 execute first and second image formation processing procedures RT1, RT2 described above with reference to FIG. 7 and FIGS. 9 to 11, in accordance with the first and second image formation processing programs pre-stored in ROM 32. However, the invention is not limited to this, and the first and second image formation processing programs may be installed by controllers 30, 86 of mobile terminals 3, 82 using a computer-readable storage medium in which the first and second image formation processing programs are stored, or the first and second image formation processing programs may be installed externally by utilizing wired and wireless communication media such as a local area network or the Internet, digital satellite broadcasting, then first and second image formation processing procedures RT1, RT2 may be executed. The computer-readable storage medium that installs the first and second image formation processing programs in mobile terminals 3, 82 in an executable state may be implemented, for instance, by a package medium such as a flexible disk, a compact disc-read only memory (CD-ROM), a digital versatile disc (DVD), or may be implemented by a semiconductor memory or a magnetic disk in which the first and second image formation processing programs are stored temporarily or permanently. As a method of storing the first and second image formation processing programs in the computer-readable storage medium, wired and wireless communication media such as a local area network or the Internet, digital satellite broadcasting may be utilized. In addition, these various programs may be stored in the computer-readable storage medium via various communication interfaces such as a router and a modem.

(3-9) Ninth Other Embodiment

Furthermore, in the first and second embodiments described above, the case has been described in which the mobile terminal and the image formation system according to the invention are applied to mobile terminals 3, 82 such as a smartphone and a tablet terminal described above with reference to FIGS. 1 to 11 and to service provider systems 1, 80 in which mobile terminals 3, 82 are connected to printers 2, 81 and the charge management server. However, the invention is not limited to this, and is widely applicable to a mobile terminal in various configurations, such as a personal computer, a mobile phone, or an information processing terminal, connectable to an image formation device, such as printers 2, 81 or multi-function peripheral (MFP), a facsimile, a multifunction machine, a copy machine, and to a charge management device such as charge management server 4, and an image formation system in various configurations, in which the mobile terminal is connected to these image formation devices and charge management devices.

The invention may be utilized for a mobile terminal, such as a smartphone and a tablet terminal, a personal computer, a mobile phone, an information processing terminal allowing communication with an image formation device and a charge management device, and an image formation system including an image formation device, a charge management device, and a mobile terminal.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation method using an image formation system, in which a mobile terminal is connected to a charge management device and an image formation device,
the method comprising:
causing the mobile terminal to connect to the charge management device via a first communication path, and to update charge information;
causing the mobile terminal to connect to the image formation device via a second communication path different from and independent of the first communication path, wherein no connection is provided between the image formation device and the charge management device via the first communication path or the second communication path; and
causing the mobile terminal to transmit print data to the image formation device via the second communication path, and thereafter to update the charge information.

2. The image formation method according to claim 1, wherein
in the step of causing the mobile terminal to connect to the charge management device via the first communication path, the mobile terminal connects to the charge management device via the first communication path by a first communication method, and
in the step of causing the mobile terminal to connect to the charge management device via the second communication path, the mobile terminal connects to the image formation device via the second communication path by a second communication method different from the first communication method.

3. The image formation method according to claim 1, further comprising:
causing the mobile terminal to connect to the image formation device via the second communication path and to obtain execution result information indicating an execution result of print image formation processing executed based on the print data; and
causing the mobile terminal to generate usable charge correction information that corrects the usable charge information based on the execution result information.

4. The image formation method according to claim 1, further comprising:
in the case where at least part of the charge information is not used for the print image formation and remains when the print image formation is performed by using the image formation device, causing the mobile terminal to switch a connection destination from the image formation device and connect to the charge management device via the first communication path, and to transmit the remaining at least part of the charge information as usable charge information, thereby causing the charge management device to manage the usable charge information.

5. The image formation method according to claim 4, further comprising:
causing the mobile terminal to connect to the charge management device via the first communication path and to obtain the usable charge information;
causing the mobile terminal to, when using the usable charge information for print image formation, determine whether or not the usable charge information is insufficient in comparison with the charge information needed for the print image formation; and
causing the mobile terminal to, when the usable charge information is insufficient in comparison with the charge information needed for the print image formation, make a prompt to additionally acquire charge information from the charge management device.

6. The image formation method according to claim 5, wherein in the step of causing the mobile terminal to transmit print data to the image formation device via the second communication path and thereafter to update the charge information,
even when the usable charge information is insufficient in comparison with the charge information needed for the print image formation, in the case where the charge information is not additionally acquired from the charge management device, the mobile terminal switches a connection destination from the charge management device, connects to the image formation device via the second communication path, transmits print data depending on the usable charge information to the image formation device, and causes the image formation device to perform the print image formation based on the print data.

7. An image formation system in which a mobile terminal is connected to a charge management device and an image formation device,
the mobile terminal comprising:
a first communication processor connected to the charge management device via a first communication path and that communicates with the charge management device;
a second communication processor connected to the image formation device via a second communication path different from and independent of the first communication path and that communicates with the image formation device; and
a first CPU configured with a program to cause the first CPU to perform operations comprising:
operation as a charge information acquirer that obtains charge information to be used for print image formation by communicating with the charge management device via the first communication processor, thereby causing the charge management device to charge for the print image formation;
operation as a connection destination identification information acquirer that obtains connection destination identification information for connecting to the image formation device via the second communication path different from and independent of the first communication path, wherein no connection is provided between the image formation device and the charge management device via the first communication path or the second communication path;
operation as a connection destination switching unit that switches a connection destination from the charge management device to the image formation device based on the connection destination identification information;
operation as a print data transmitter that in response to the switching of the connection destination by the connection destination switching unit, transmits print data depending on the charge information to the image formation device through communication via the second communication processor, thereby causing the image formation device to perform the print image formation based on the print data; and operation as a charge information updater that updates the charge information according to the print image formation performed by the image formation device, the charge management device comprising a second CPU configured with a second program to cause the second CPU to perform operations comprising:

operation as a charge management device communication unit connected to the mobile terminal via the first communication path and that communicates with the mobile terminal; and operation as a charge processor that transmits the charge information to the mobile terminal via the charge management device communication unit, thereby charging for the print image formation, and the image formation device comprising a third CPU configured with a third program to cause the third CPU to perform operations comprising:

operation as an image formation device communication unit connected to the mobile terminal via the second communication path and that communicates with the mobile terminal; and operation as a print image formation unit that takes in the print data transmitted from the mobile terminal via the image formation device communication unit and that performs the print image formation based on the print data.

8. A mobile terminal capable of communicating with a charge management device and an image formation device, the mobile terminal comprising:

a first communication processor that is connected to the charge management device via a first communication path and that communicates with the charge management device;

a second communication processor that is connected to the image formation device via a second communication path different from and independent of the first communication path and that communicates with the image formation device; and a CPU configured with a program to cause the CPU to perform operations comprising:

operation as a charge information acquirer that obtains charge information to be used for print image formation by communicating with the charge management device via the first communication processor, thereby causing the charge management device to charge for the print image formation;

operation as a connection destination identification information acquirer that obtains connection destination identification information for connecting to the image formation device via the second communication path different from and independent of the first communication path, wherein no connection is provided between the image formation device and the charge management device via the first communication path or the second communication path;

operation as a connection destination switching unit that switches a connection destination from the charge management device to the image formation device based on the connection destination identification information;

operation as a print data transmitter that in response to the switching of the connection destination by the connection destination switching unit, transmits print data depending on the charge information to the image formation device through a communication via the second communication processor, thereby causing the image formation device to perform the print image formation based on the print data; and operation as a charge information updater that updates the charge information according to the print image formation performed by the image formation device.

\* \* \* \* \*